United States Patent
Hu et al.

(10) Patent No.: US 9,811,061 B1
(45) Date of Patent: Nov. 7, 2017

(54) METHOD FOR MANAGEMENT AND OPTIMIZATION OF HYDROPOWER GENERATION AND CONSUMPTION

(71) Applicant: The Energy Authority, Inc., Jacksonville, FL (US)

(72) Inventors: Zengjian Hu, Sammamish, WA (US); John Putz, Seattle, WA (US); Sean J. Mackey, Jacksonville, FL (US); Yuen Y. Chan, Bellevue, WA (US); Yohan Sutjandra, Saint Johns, FL (US); Jonah Tsui, Bellevue, WA (US)

( * ) Notice: Subject to any disclaimer, the term of this patent is extended or adjusted under 35 U.S.C. 154(b) by 746 days.

(21) Appl. No.: 14/053,432

(22) Filed: Oct. 14, 2013

Related U.S. Application Data

(63) Continuation-in-part of application No. 12/956,497, filed on Nov. 30, 2010, now abandoned, which is a continuation of application No. 11/380,401, filed on Apr. 26, 2006, now Pat. No. 7,873,442, which is a continuation-in-part of application No. 10/152,088, filed on May 20, 2002, now Pat. No. 7,089,190.

(60) Provisional application No. 61/713,976, filed on Oct. 15, 2012, provisional application No. 60/675,342, filed on Apr. 26, 2005, provisional application No. 60/291,848, filed on May 18, 2001.

(51) Int. Cl.
G05B 15/02 (2006.01)

(52) U.S. Cl.
CPC .................................. *G05B 15/02* (2013.01)

(58) Field of Classification Search
CPC ......... G05B 15/02; G06Q 50/06; H02J 3/008; H02J 3/14; Y02B 70/3225; Y04S 20/222
See application file for complete search history.

(56) References Cited

U.S. PATENT DOCUMENTS

| | | | | |
|---|---|---|---|---|
| 5,974,403 A | * | 10/1999 | Takriti | G06Q 10/06 702/180 |
| 7,089,190 B2 | * | 8/2006 | Tsui | G06Q 10/06 705/63 |
| 7,873,442 B2 | * | 1/2011 | Tsui | H02J 3/008 700/291 |
| 8,527,072 B2 | * | 9/2013 | Piche | H02J 3/38 700/29 |
| 8,880,202 B2 | * | 11/2014 | Francino | G05B 17/02 700/28 |

(Continued)

OTHER PUBLICATIONS

Yao et al., "Large-Scale Stochastic Optimization for Unit Commitment and Economic Dispatch," FY2012 LDRD Progress Report, Lawrence Livermore National Laboratory, (Sep. 2012), pp. 1-12.*

(Continued)

*Primary Examiner* — M. N. Von Buhr
(74) *Attorney, Agent, or Firm* — Rogers Towers, P.A.; Joseph P. Kincart

(57) ABSTRACT

An optimization and management system using a global linearization approach and mixed integer linear programming to perform the dispatch and to schedule a river system for ten days forward while subject to real world, hourly physical, biological, environmental, and recreational constraints. The optimizer system uses a combination of slack variables and stitching methods to approximate a highly nonlinear optimization problem, thereby generating realtime generation schedules to promote to the management authority.

20 Claims, 17 Drawing Sheets

(56) References Cited

U.S. PATENT DOCUMENTS

| | | | | |
|---|---|---|---|---|
| 2004/0143467 | A1* | 7/2004 | McAllister | G06Q 40/04 705/37 |
| 2004/0254899 | A1* | 12/2004 | Abe | G06Q 10/06 705/412 |
| 2004/0257858 | A1* | 12/2004 | Mansingh | G06Q 50/06 365/154 |
| 2005/0015283 | A1* | 1/2005 | Iino | G06Q 10/06315 705/4 |
| 2005/0246220 | A1* | 11/2005 | Thomson | G06Q 10/04 705/7.35 |
| 2007/0129930 | A1* | 6/2007 | Peralta | G06F 11/3447 703/22 |
| 2007/0168174 | A1* | 7/2007 | Davari | G06F 17/50 703/18 |
| 2011/0066258 | A1* | 3/2011 | Torzhkov | G05B 13/042 700/29 |
| 2012/0191264 | A1* | 7/2012 | Kalich | F04B 35/004 700/287 |
| 2012/0191426 | A1* | 7/2012 | Kalich | G06Q 10/04 703/2 |
| 2013/0090774 | A1* | 4/2013 | Kalich | G06F 17/5086 700/287 |
| 2013/0282195 | A1* | 10/2013 | O'Connor | F01K 13/02 700/291 |
| 2014/0018971 | A1* | 1/2014 | Ellis | G06Q 10/04 700/297 |

OTHER PUBLICATIONS

Guan et al. "An Optimization-Based Algorithm for Scheduling Hydrothermal Power Systems with Cascaded Reservoirs and Discrete Hydro Constraints," IEEE Transactions on Power Systems, vol. 12, No. 4, (Nov. 1997), pp. 1775-1780.*

Abgottspon, Hubert, "Mid-Term Hydro Power Planning for Energy and Ancillary Services," MA/MS Diss., ETH Eidgenossische Technische Hochschule, Zurich, (2009), pp. 1-102.*

Chang et al., "Experiences With Mixed Integer Linear Programming Based Approaches on Short-term Hydro Scheduling," IEEE Transactions on Power Systems, vol. 16, No. 4, (Nov. 2001), pp. 743-749.*

Aghaei et al., "Mixed Integer Programming of Generalized Hydro-Thermal Self-Scheduling of Generating Units," Elecrical Engineering, vol. 95, No. 2, (Jun. 2013, first online May 2012), pp. 109-125.*

Sulek, P., "A Hydro Power System Operation Using Genetic Algorithms and Mixed-Integer Nonlinear Programming," Slovak Journal of Civil Engineering, vol. XX, No. 1, (2012), pp. 1-9.*

Garcia-Gonzalez et al., "Short-Term Hydro Scheduling with Cascaded and Head-Dependent Reservoirs Based on Mixed-Integer Linear Programming," 2001 IEEE Porto Power Tech Conference, (Sep. 2001), pp. 1-6.*

Abolghasemi Riseh, Hamideh. Optimization of the Kootenay River hydroelectric system with a linear programming model. Diss. University of British Columbia, 2008.*

Catalão, João Paulo da Silva, Hugo Miguel Inácio Pousinho, and Victor Manuel Fernandes Mendes. "Hydro energy systems management in Portugal: profit-based evaluation of a mixed-integer nonlinear approach." Energy 36.1 (2011): 500-507.*

Catalão, João Paulo da Silva, Hugo Miguel Inácio Pousinho, and Victor Manuel Fernandes Mendes. "Mixed-integer nonlinear approach for the optimal scheduling of a head-dependent hydro chain." Electric Power Systems Research 80.8 (2010): 935-942.*

Lima, Ricardo M., et al. "On the computational studies of deterministic global optimization of head dependent short-term hydro scheduling." IEEE Transactions on Power Systems 28.4 (2013): 4336-4347.*

* cited by examiner

METHOD FOR MANAGEMENT AND OPTIMIZATION OF HYDROPOWER GENERATION AND CONSUMPTION

CROSS REFERENCES TO RELATED APPLICATIONS

This application makes reference to, claims priority to, and claims the benefit of U.S. provisional patent application Ser. No. 61/713,976, filed on Oct. 15, 2012, and is a continuation-in-part of U.S. patent application Ser. No. 12/956,497, filed on Nov. 30, 2010 and now abandoned, which is a continuation of U.S. patent application Ser. No. 11/380,401, now U.S. Pat. No. 7,873,442, which claimed priority to U.S. provisional patent application Ser. No. 60/675,342, filed on Apr. 26, 2005, and is a continuation-in-part of U.S. patent application Ser. No. 10/152,088, now U.S. Pat. No. 7,089,190, which claims priority from U.S. provisional patent application Ser. No. 60/291,848, filed on May 18, 2001. The entire contents of U.S. provisional patent application Ser. No. 61/713,976 and U.S. patent application Ser. No. 12/956,497 are incorporated herein by this reference.

BACKGROUND (a) Field of the Invention

The field of invention is optimization and management of a serial, non-linear, hydropower generation system on an hourly basis based on economic and trader inputs. The optimization and management system described herein uses a global linearization approach and mixed integer linear programming to perform the dispatch and to schedule a river system for ten days forward while subject to real world, hourly physical, biological, environmental, and recreation constraints.

(b) Description of Related Art

In many areas of the country, watershed systems are managed by systems comprising a series of hydroelectric dams that provide significant electrical power to the surrounding area. These hydroelectric systems are very complex, and past and present management tools are inadequate to accommodate the variables, constraints, and other complexities of these systems.

For example, power in the northwest United States comes from a variety of sources and levels. The largest provider of hydropower in the northwest United States is the Columbia watershed system. Other power generation sources include natural gas, turbine engines, wind, and solar power. Because the Columbia River 8 watershed provides an abundant source of hydroelectric power, the cost to produce this power is much less than other power resources. Consequently, the administrative authority, Bonneville Power Administration ("BPA"), wields considerable influence over the local power market.

The Columbia River watershed consists of a series of forty-two dams along the main rivers and tributaries. Not all of the dams have power generation capacity. Further, those dams which do have power generation capacity do not run all at the same time. The Columbia River 8 watershed system was initially built for flood control, irrigation, navigation, recreation, fishing, and lastly hydroelectric power.

The design purposes of the Columbia River watershed system represent varying levels of competing interests for use of the natural resource. These competing interests include the local farming communities that require flood control and irrigation, the nautical transportation industry that requires a minimum flow to maintain a navigable waterway, and the fishing and recreational communities that use the waterway in various ways. These competing interests limit the BPA's ability to maximize the hydroelectric power capacity of the Columbia River watershed system. Consequently much of the storage capacity may go unused.

Within the geographic region served by BPA are a series of municipalities, counties, and public utility districts (PUD's), which are essentially areas comprising an aggregate group of power users. Each municipality, county, or public utility district may have varying load requirements based on its own unique demographic characteristics. For example, one PUD may be comprised of industrial type power users, while another PUD may be comprised of residential communities. Thus the power load required to service these users varies based on characteristics such as time and quantity of use. BPA distributes the power to the respective power users including PUD's. These power users generally in turn sell the power to the consumer such as businesses and residences. The power may also be traded on the open market.

To alleviate the high overhead of managing such a complex power distribution and accounting system, the BPA developed an "energy product" to sell to the various PUD's. The sale of this energy product is based on an entitlement system called the "Slice" entitlement system. The energy product is itself referred to as a "Slice contract." Each qualified PUD has the option of entering into a long term Slice contract entitling the PUD to a certain percentage of the hydroelectric power output from the BPA over a given period of time. PUDs that do so are called "Slice customers." In many instances, the Slice contract is but one of many power resources that might comprise a PUD's energy sources.

The Slice product itself is predominantly comprised of hydropower generation resources. Like other hydropower resources, it is unique in that the present use of the resource influences how much of the resource is available in the future. For example, once water is released from a reservoir to generate electricity, that water is not immediately replaced. Nature replaces the resource through precipitation and runoff. Therefore, effective planning and forecasting of the Slice resource is essential to the Slice customer's long-term profitability.

The Slice resource consists of two main components—a "Balance-of-System" ("BOS") component and a "Dispatchable" Slice component. The BOS consists of non-hydropower generation, primarily generation from the Columbia Generation Station Nuclear Reactor, and hydropower generation from the Snake River. The BOS generation is non-dispatchable meaning that the amount of BOS generation in each hour is determined by BPA and communicated to the customer.

Approaches to Managing the Contract

There are potentially a number of approaches available to Slice customers in deciding how to manage their Slice resource. Broadly speaking, there are two different types of approach, each of which has several varieties. The first type is a "shaping and validation" approach. The second type is optimization.

A. Shaping and Validation

The shaping and validation approaches rely on the fact that BPA has provided a system that will take the schedules as submitted by a customer and, in a sequential order, apply the various constraints to those schedules. If the schedules are outside the constraints for a specific dam for a specific hour the system, a computer program known as a simulator and operated by BPA, will attempt to modify those schedules to bring them into compliance. Therefore, utilities taking this approach will attempt to create schedules that are reasonably close to meeting the constraints, and then have the simulator modify them to bring them within compliance.

B. Operator Driven Management

The approach that BPA uses to run the actual Columbia River system is to allow planners and operators to use their own judgment and tools to manage the system and keep the system within the constraints. BPA has arrived at a number of heuristics to enable this approach, such heuristics including keeping the lower Columbia River projects between one-half and two-thirds full for example. A Slice customer pursuing this option will generate the schedules suggested by the heuristics and then let BPA's simulator determine how the schedules need to be modified to make them feasible.

C. Statistical Simulation

Another simulator-based approach is to algorithmically generate many potential schedules which would all be run through the customer's own version of Simulator so that the Simulator could determine which ones of those are feasible.

D. Basic Shaping

A third approach is to develop a tool to generate a reasonable schedule based on one of a set of possible strategies. An example of a strategy would be to gradually fill or draft Grand Coulee and then, within those confines, to put more generation into peak hours (7 am to 10 pm) and less in the other hours. This schedule would then be submitted to the simulator to be turned into a feasible schedule.

E. Other Optimization Approaches

The other type of approach to managing the Slice contract is to reach an optimization by solving the hydropower and generation variables subject to the constraint equations. Given that the variables have non-linear relationships to one another, there are a few different strategies that may be employ to accomplish this optimization.

E.1. Non-Linear Solver

Given that the problem is non-linear, one approach is to use a non-linear solver to solve the system.

E.2. Successive Linear Approximation

Another approach is to use the successive linear approximation (SLA) technique. In this technique, one posits an initial solution and linearizes the equations around this solution via first order Taylor series approximations, and then seek a better solution in the region around one's initial solution. This procedure is repeated until convergence is reached.

E.3 Stochastic Optimization

Yet another approach is to recognize the fact that while the problem that BPA presents is a deterministic problem—i.e. the inputs to the system such as the inflow forecasts and the constraints are presumed to be correct and must be honored by the customer's schedules—that in reality those inputs will change in unpredictable ways prior to the time when they become realized. The problem therefore is fundamentally random and to solve it while recognizing that randomness is best done using a stochastic optimization approach.

Insufficiency of Past and Current Approaches

Given complexities of the competing interest and non-linearity of optimizing power generation from the multi-dam hydropower generation system, none of the approaches listed above deliver a reasonable chance of delivering an adequate optimization in a timely manner. The primary impediment is the need to dispatch the river rapidly enough given the time constraints of the 45-minute window faced by the traders, as explained below.

Using any of the optimization techniques mentioned above would mean the process to produce feasible schedules would be too long to run on an hourly basis. Therefore the traders would need to dispatch the system for multiple hours or a day at a time. This approach would compromise ability to flexibly change the generation and capacity on an hourly basis, which was the main reason for becoming a Slice customer in the first place.

The nature of the shaping and validation approaches places substantial limitations on the ability to accurately shape the schedules on an hourly basis or in real-time. Faced with these limitations, the traders are forced to propose schedules further in advance. The necessity of this extra lead time means that the trader can still propose a schedule, but without any assurance that the request will be accepted by the management authority. Without these assurances, the trader typically chooses a more conservative scheduling request, seeking a schedule in the middle of the range of possible values in order to have the highest chance of receiving what is requested.

The present system and method seeks to address the complexities and limitations explained above by providing an optimization and management system that uses a global linearization approach and mixed integer linear programming to perform the dispatch and to schedule a multi-dam hydropower system for an allotted look-ahead time period while subject to real world, hourly physical, biological, environmental, and recreational constraints.

SUMMARY OF THE INVENTION

Managing a serial, multi-dam hydropower generation system with annual hydro storage capability involves a variety of processes spanning a range of time frames. The optimizer system is designed to support those processes. On a monthly basis planners manage the storage reservoir and track and manage compliance with system rules and regulations. On an intra-month basis, cash and forward traders allocate water/generation based on risk mitigation objectives and economics. During any given day, real-time traders dispatch the system to meet load and to generate revenue. Over all the time horizons, operators are accounting for uncertainties in inflows and prices.

One feature of the optimizer system is the ability to manage environmental constraints, such as a constraint that a particular dam's forebay must be between a minimum and maximum amount for a particular hour. The optimizer system solves a linear mixed integer programming model to obtain results within the BPA environmental constraints for the next ten days, provided that a mathematical solution exists. The optimizer system allows planners to set their own constraints that are more constraining than BPA's so that the planners can create buffers between the optimized results and BPA's constraints.

The optimizer system contains functionality to assist the planners in their Slice-to-Load management on a planning (future) basis. This functionality allows planners to specify a quantity of power that should be delivered to load on a daily basis, as well as the amount of non-Slice hydropower generation that is forecast to be delivered to load. In combination with the load forecast, the optimizer system can then allocate the Slice hydropower generation on an hourly basis in a manner that attempts to comply with the planner's request.

The optimizer system enables its user to manage uncertainty inherent to the hydro system. Everything that the planners do is subject to uncertainties, particularly uncertainties in inflows. The most robust way to handle this uncertainty would be to perform a stochastic optimization with the inflows modeled stochastically. However, due to the real-time time constraints, such an approach is not workable. Instead the optimizer system facilitates a scenario based approach to managing uncertainty.

The optimizer system enables its user to engage in forward trading. Power trades in a variety of markets. The forward markets that are relevant for the timeline with which the optimizer system is concerned are the day-ahead market (DA) and weekly or balance-of-month (BOM) markets. Generally speaking the forward traders try to hedge the PUD's positions in the forward markets in order to reduce the risk of exposure to real-time prices. The optimizer system enables this process in several ways, namely, by allowing traders to: view their available Slice generation and flexibility; set daily generation targets; impose economic constraints; and analyze different scenarios.

The optimizer system enables the user to create daily generation targets. As the optimizer system optimizes to a changing set of inputs, such as inflows, constraints, prices, it is desirable to be able to control how much generation the system tries to allocate to particular days. If the traders trade a certain amount for a day in the future, but then, due to price forecasts changing, the optimizer system changes the amount of generation allocated to that day, the traders' intention of hedging and reducing risk for that day may be undermined.

The optimizer system enables economic constraint management. The optimizer system also has the capability to set constraint violation penalties at values that result in different behaviors depending upon price and other signals in the system. For example, traders may set multiple constraints on important variables, such as forebays. The most constraining constraints will have a fairly low penalty, while the penalties will gradually become larger as the constraints become less constraining. Therefore, under a low price regime, the optimizer system will keep the watershed system on a conservative track, whereas if prices increase or decrease markedly, the optimizer system will allow the river to deviate from the more conservative track to take advantage of those prices.

The optimizer system enables real-time trading. The most challenging business processes to meet were those belonging to the real-time trading function. Real-time trading operates on an hourly cycle. Within that time frame, the Slice customer must determine the needed supply and demand positions, trade any surplus or deficit positions, schedule the power flows from sources to sinks, and fulfill all of their requirements to notify BPA and other relevant parties of their plans for each hour. Should the Slice customer fail to do any of these functions correctly, it is subject to potentially large financial penalties. One embodiment of the optimizer system has been designed to support these stringent, time-dependent processes.

In order to perform an optimization, the present optimizer system optimizes to a "utility function." In many embodiments, it is convenient to correlate the utility function to a desired level of profit or revenue for mathematical convenience. In actuality, there are other components to the utility function, such as if a constraint is violated then the utility function incurs a cost which is equal to the amount of the violation times the dollar penalty per violation per MWh. These constraints, in effect, act as mathematical buffers around the BPA constraints.

Another method by which the optimizer system supports balancing positions is by allowing a trader to input an hourly generation target, which is a component of the utility function. The traders have the capability to adjust the penalty associated with this generation target so that the trader can set a high penalty to ensure that the optimizer system prioritizes hitting the generation target over optimizing to price. The trader can set a lower penalty to incorporate the generation target into the overall optimization without disregarding prices.

Finally, the optimizer system supports the balancing process by performing its work quickly. As mentioned previously, the key design criterion for the optimizer system was to be able to produce feasible schedules quickly to enable the traders to economically manage multiple Slice customer portfolios simultaneously. In order for the traders to perform their jobs within the allotted time, it is necessary that the optimization process be completed within minutes.

Dispatchers often need to re-optimize hydropower generation based on new data once they know the results of a first optimization. With that in mind, the optimizer system implements a technique called "stitching". A stitching optimization takes all the hours beyond the stitching period (typically 2 days) and constrains the optimization further such that the fixed variables are not allowed to vary from the previous, ten-day optimization result.

In sum, one embodiment of the method for optimization and management of a serial hydro generation system disclosed herein comprises the steps of:

providing to a computer-based optimizer engine a set of input data for optimizing power generation from a multi-dam hydropower generation system, the input data comprising:
  (a) environmental constraints provided by an authority charged with managing the multi-dam hydropower generation system;
  (b) time dependent generation targets for specifying the amount of power generation requested on a time dependent basis by a user of power generated by the hydropower generation system; and
  (c) market and physical data representing the forecasted power and capacity prices, load forecast, and non-load obligations for the user;

converting the input data, using the computer-based optimizer engine, from real-world metrics into a uniform metric such that each subset of input data is characterized in consistent units;

compiling, using the computer-based optimizer engine, a mixed integer linear programming model based on the input data;

computing, using a computer-based solver in operable communication with the optimizer engine, a set of optimized results derived from optimizing the mixed integer linear programming model in relation to a utility function;

reconverting the optimized results, using the computer-based optimizer engine, from the uniform metric into the real-world metrics;

producing a power generation schedule based on the optimized results; and promoting the power generation schedule to the authority for scheduling power generation by the hydropower generation system.

DETAILED DESCRIPTION

With reference to the drawings, the optimization and management system and method will now be described with regard for the best mode and the preferred embodiment. In general, the optimization and management system and method described herein uses a global linearization approach and mixed integer linear programming to optimize the hydropower generation levels, perform the dispatch, and schedule the multi-dam hydropower generation system for a look-ahead period while subject to real world, hourly physical, biological, environmental, and recreational constraints.

The embodiments of the system and method for management and optimization of hydropower power generation and consumption taught herein were developed in the particular environment of the Columbia River 8 watershed system. Accordingly, it is believed that a clearer understanding will be obtained by relating the following exemplary embodiments to this watershed system. For convenience of the following description, terminology, and references will be made to BPA as the authority charged with managing the multi-dam hydropower generation system in the Columbia River 8 watershed area.

The embodiments disclosed herein are meant for illustration and not limitation of the invention. The description of the system and method are intended to apply more broadly to other situations in environments where similar or related conditions would be present, and the elements or components having specific designations are to be interpreted more broadly. Also, the term "BPA" is not intended for exclusive reference to the Bonneville Power Administration, but also to other companies, entities, or authorities in the power industries which have operations sufficiently related to the present embodiment for multi-dam hydropower generation watershed systems. An ordinary practitioner will appreciate that it is possible to create many variations of the following embodiments without undue experimentation.

As used in the embodiments disclosed herein, an operator is the owner or administrator of the optimizer system 100 described herein. A planner is an entity tasked with managing the hydrologic elements of the watershed system. A trader is an employee of a utility or other electricity company who manages load obligations and a portfolio of assets, such as generation sources and or contracts, and transacts in power markets to achieve various objectives.

Figure 1:
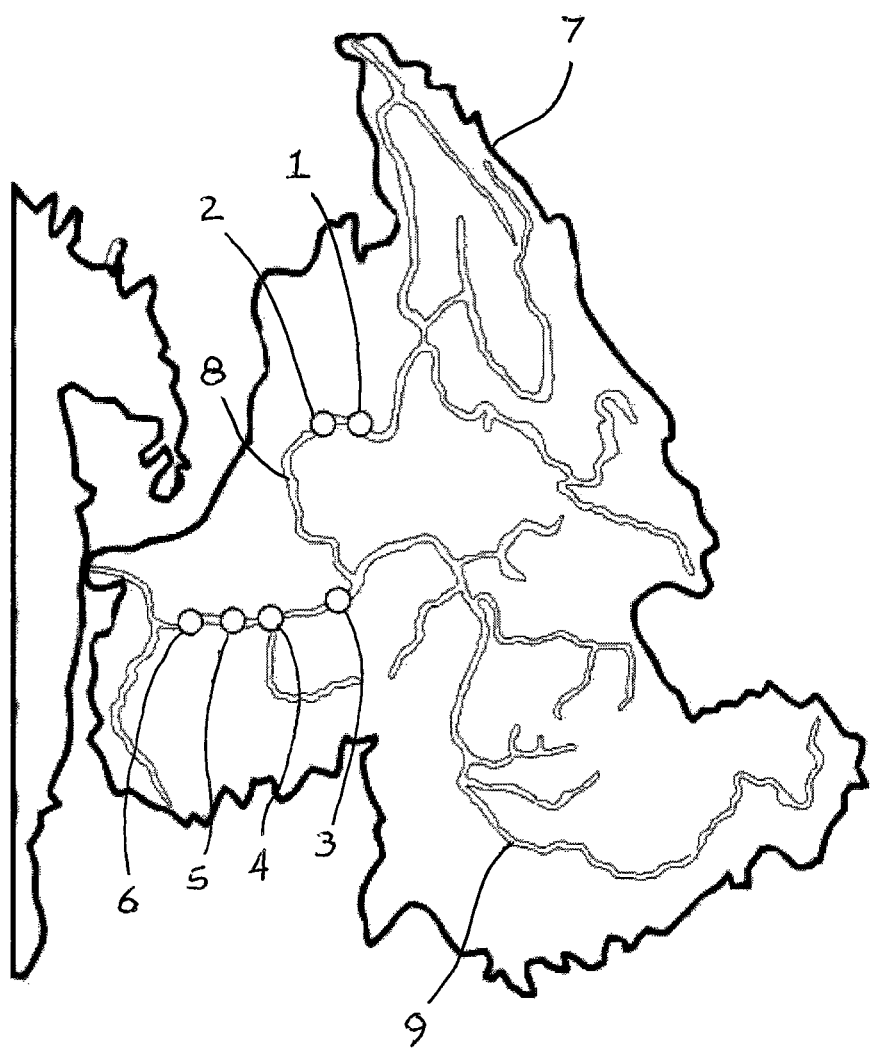
FIG. 1 is a plan view of dams in the BPA service area.

In the following embodiments, the Slice component is produced by the six large federal hydro projects on the main stem of the Columbia River 8. As shown in FIG. 1, these six dams consist of two on the upper river—Grand Coulee 1 and Chief Joseph 2, and four on the lower river—McNary 3, John Day 4, The Dalles 5, and Bonneville 6. These six dams are referred to as "Slice projects." A number of other dams owned and managed by other utilities are also in the watershed region 7.

The Optimizer

Wholesale Power Markets

The primary objective of the optimizer system 100 is to enable Slice customers to manage their Slice contract to meet their obligations. These obligations include providing power to their customers and to participating in the wholesale electricity market in such a way as to provide the most economically beneficial outcomes for their owners within the environmental constraints imposed by BPA.

Figure 2:
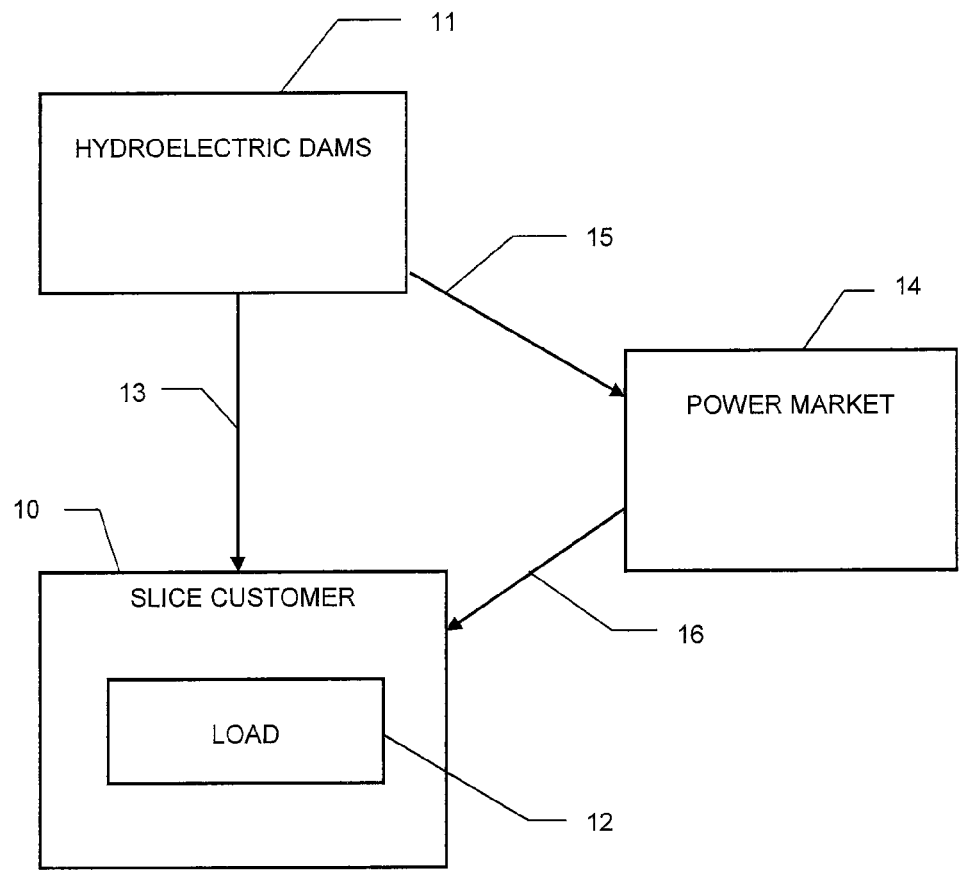
FIG. 2 is a schematic showing the wholesale utility operations.

FIG. 2 shows a schematic of the high-level processes a Slice customer 10 will undertake in conducting its business. Within the BPA balancing authority, a Slice customer 10 receives generation from the BPA managed hydroelectric dams 11 along the Columbia River 8 and Snake River 9 and delivers it to its load 12 through the use of BPA's transmission system 13. If the Slice customer 10 has surplus generation in an hour, that Slice customer 10 will sell the surplus in the wholesale power market 14 and deliver it via BPA and possibly other companies' transmission systems 15. If the Slice customer does not have enough of its own generation to meet its load, it will buy from the market and deliver 16 the energy to its load 12.

Hydro Operations

Figure 3:
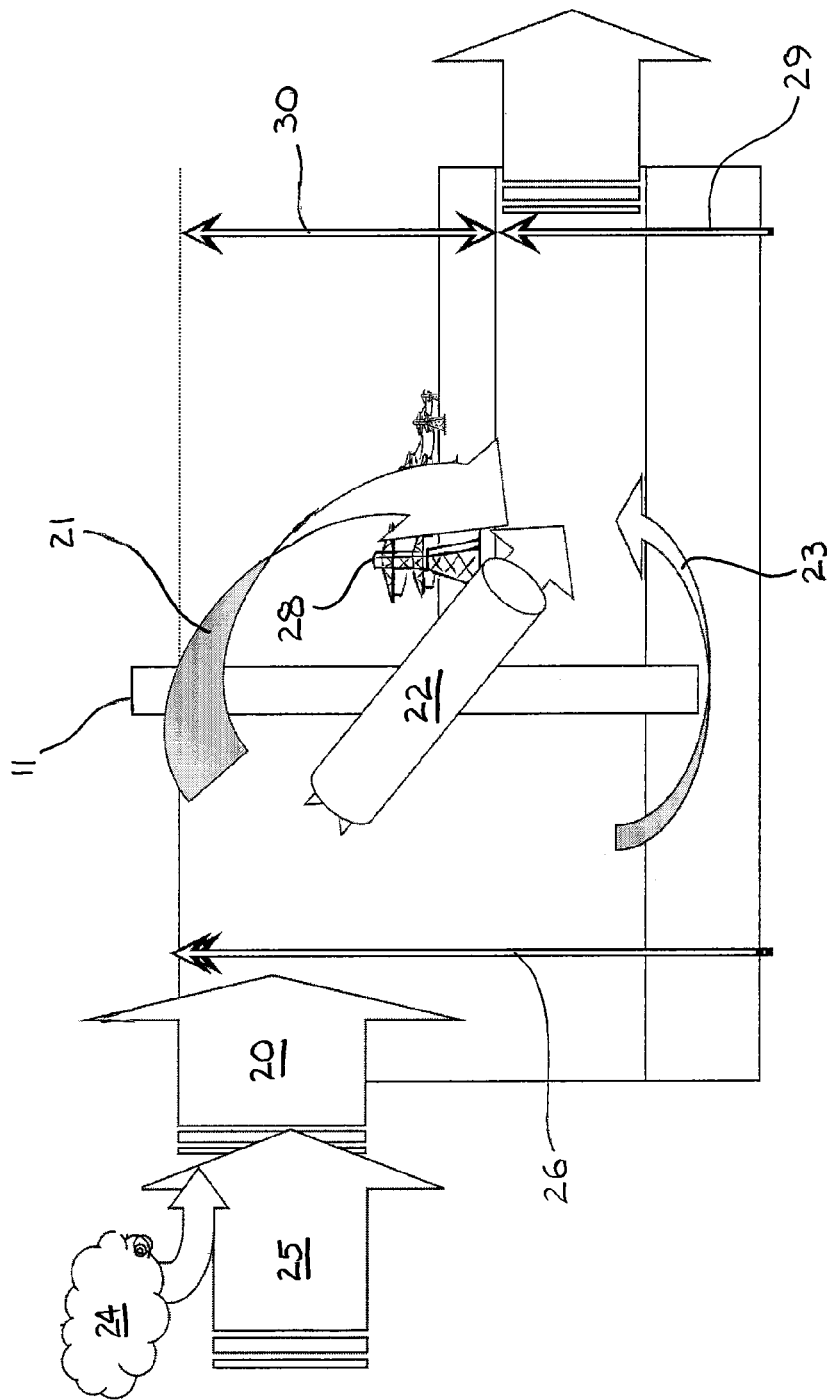
FIG. 3 shows the relationship between the hydropower generation variables.

The hydro variables that describe the operation of a hydroelectric dam 11 are shown in FIG. 3. These variables describe the amount of flows into and out of the dam (inflow, discharge), the levels of water up-river and down-river of the dam (forebay, tailwater), the efficiency with which the dam generates power (H/K), the amount of flow through the generating turbines (turbine flow) and over the top of the dam (spill flow), and the amount of generation.

At each hydroelectric dam 11 location, the total inflow 20 plus or minus the content change of the storage reservoir 19 is equal to the spill flow 21 plus the turbine flow 22 plus the bypass flow 23, the combination of which is equal to the total outflow. The total inflow 20 is the combination of the side flow 24 and the lagged upstream discharge 25. The forebay 26 is measured on the upstream side of the hydroelectric dam 11, and the tailwater 27 and head 30 are measured on the downstream side of the hydroelectric dam 11. Power generation 28 is determined by multiplying the turbine flow 22 by the H/K factor.

The operation of the dams on the Columbia River 8 is dictated by a number of factors as referred to earlier. There are physical limitations based upon the height of the dam and the number and size of turbines. There are also environmental constraints and other constraints based on salmon biology, recreation requirements, flood control, and other types of environmental constraints. These environmental constraints control the operation of the individual dams. The basis for operating the system is a set of assumptions about the inter-dependencies of different variables and the rate at which water flows between the dams. These assumptions are based on historical observations and data, as will be described in more detail below.

The other major factor which determines how the watershed system is operated is forecasts for the amount of water flowing into the rivers. The Slice contract allows for a Storage Offset Adjustment (SOA), which is a provision that accounts for the variability of many factors, such as inflow forecasts, the relationship between different hydro variables, the rate at which water flows down the river, and other factors. The variability in these factors means that the measurement of actual levels and flows are all imperfect. The SOA sums all the differences between forecasted and actual measured amounts and creates an adjustment to the next hour's inflow forecast to account for the variability. BPA also uses the most recent actual generator efficiencies to set the projected efficiencies for Slice customers.

A Slice customer 10 must manage the dispatchable Slice projects to meet all of the environmental constraints imposed upon the hydro and generation variables, given the inflow forecasts provided by BPA, including the SOA amounts. Typical environmental constraints are published by BPA and shown below in Table 1.

TABLE 1

| Variable | Type | # Projects | Max Possible |
|---|---|---|---|
| Generation | Min/Max | 6 | 12 |
| Turbine Flow | Min/Max | 6 | 12 |
| Forebay | Min/Max | 6 | 12 |
| BON Discharge (Formula) | Min | 1 | 1 |
| Discharge | Min/Max | 6 | 12 |
| GCL Tailwater (Formula) | Min | 1 | 1 |
| Tailwater | Min/Max | 4 | 8 |
| 1 hour Discharge Ramp | Min/Max | 6 | 12 |
| GCL Tailwater Ramp (Formula) | Min | 1 | 1 |
| 1 hour Tailwater Ramp | Min/Max | 4 | 8 |
| 1 day BON Discharge (Formula) | Min | 1 | 1 |
| 1 day Average Discharge | Min/Max | 6 | 12 |
| 24 hour Forebay Ramp | Min/Max | 6 | 12 |
| 24 hour Discharge Ramp | Min/Max | 6 | 12 |
| 24 hour Tailwater Ramp | Min/Max | 4 | 8 |
| MCN 80% Weekend Rule (Formula) | Min | 1 | 1 |
| CHJ Accumulated Discharge | Total | 1 | 1 |
| Weekly Average Discharge | Min/Max | 6 | 12 |
| Forebay | Band | 6 | 6 |
| Forebay | Touchpoint | 6 | 6 |
| Spill Flow | Min/Max | 6 | 12 |
| Spill Percentage | Min/Max | 6 | 12 |
| Incremental Generation Reserve | Min | 1 | 1 |
| Decremental Generation Reserve | Min | 1 | 1 |
| Total | | | 176 |

Specifically, the primary requirements of the Slice contract are: (1) on a daily basis, promote to BPA a set of hydro and/or generation schedules for each of the six dispatchable Slice projects, for each hour of the next ten days, that meets all of the environmental constraints that BPA has placed on the operation of the hydropower generation system; and (2) on an hourly basis, promote to BPA a set of hydro and/or generation schedules for each of the six dispatchable projects that meets all of the environmental constraints.

Objectives of an Optimizer

Because of the real-world demands due to the business requirements for the optimizer system, none of the prior optimization approaches are satisfactory. An improved optimizer should address the following considerations.

Compliance—The Slice customers, like BPA itself, are required to comply with all of the regulations and laws which regulate the way in which the Columbia River system is managed. These regulations are enforced through the environmental constraints imposed upon operation of the multi-dam hydropower generation system.

Management of Uncertainty—The fundamental fact of a hydropower system, particularly one as large and complex as the Columbia River system, is that it is subject to significant uncertainties. The greatest uncertainty derives from the uncertainty of nature in terms of precipitation, temperature, and the rate of snow melt and accumulation. The other main uncertainty comes from the unpredictability of market price changes.

Energy Shaping—As described above, the ability to shape generation as the Slice customer 10 sees fit is the primary motivation to become a Slice customer.

Capacity—Another requirement is to manage not only the energy generated but also the capacity—the ability to change the energy being generated—of the multi-dam hydropower generation system. This enables a Slice customer 10 to adapt to changes in supply or demand or prices.

Speed—Another criteria for the optimizer system 100 is to enable its users 70 to function in the hour-to-hour process, or in "real-time". In this process, traders need to reassess in real-time the Slice customers' net position, long or short, on an hourly basis, dispatch more or less generation, transact in the wholesale markets, and schedule the power flows from source to sink, all within an approximately 45 minute window.

Water Storage—In addition to these short-term considerations, the optimizer system 100 also has to facilitate the long-term planning requirements of the system, particularly managing the storage of water at the Grand Coulee Dam.

Scheduling—Because the multi-dam hydropower generation system does not have the ability to store electricity, it is necessary that the entire system be balanced at every moment in terms of the net of supply and demand. In the wholesale electricity market, which is the arena where the Slice customers operate, this requirement must be met on an hour-by-hour basis or the Slice customers incur penalties levied by BPA, which must then make up the differences for one Slice customer's overreaching demand. Since the Slice resource is the main dispatchable resource for the Slice customers, the optimizer system 100 must allow the operators to fine-tune the amount of generation being generated in any hour to ensure a zero net position.

Arbitrage—another criterion for the design of the optimizer system 100 is the ability to realize value across the various markets that transact wholesale power. In particular, the day-ahead and real-time (hourly) markets are both liquid markets where utilities may buy and sell wholesale power. Should prices be higher in one market than the other, there are opportunities to realize the differences between the two markets on a low risk basis if one is able to move water back and forth, such as between one day and the next. There are other markets as well, such as the weekly market, where similar ideas apply.

Interfaces—A technical requirement was that the system be able to exchange information with other systems, particularly scheduling systems. Scheduling systems are the systems that allow traders to manage multiple sources of supply and demand at different physical locations along with transmission assets to move the power from supply to demand. Examples of such scheduling systems are commercially available from sources such as Allegro Development Corporation, Triple Point Technology, and OpenLink Financial, LLC.

Global Linearization

In order to meet the objectives set forth above, there are two criteria in particular that drive the solution. The first is that the optimizer system 100 be able to determine feasible schedules in a short amount of time. The second is that the traders be able to dispatch the optimizer system 100 to the power generation level that they desire with that level being determined by factors that are important to the trader as described above.

Given the complexity of the problem in terms of the number of variables, the number of constraints, and the non-linearity of the equations, the only approach that would meet the performance criteria is a linearization of the problem. The SLA approach to linearization however leads to volatile solutions as the result will be a locally, but not globally, optimal solution and therefore will tend to jump from one locally optimal solution to another depending on the starting conditions.

Optimizer Process

Managing a serial, multi-dam hydropower generation system with annual hydro storage capability involves a variety of processes spanning a range of time frames. The optimizer system 100 is designed to support those processes. On a monthly basis planners manage the storage reservoir and track and manage compliance with system rules and regulations. On an intra-month basis, cash and forward traders allocate water/generation based on risk mitigation objectives and economics. During any given day, real-time traders dispatch the system to meet load and to generate revenue. Over all the time horizons, operators are accounting for uncertainties in inflows and prices.

Planning

Figure 4:
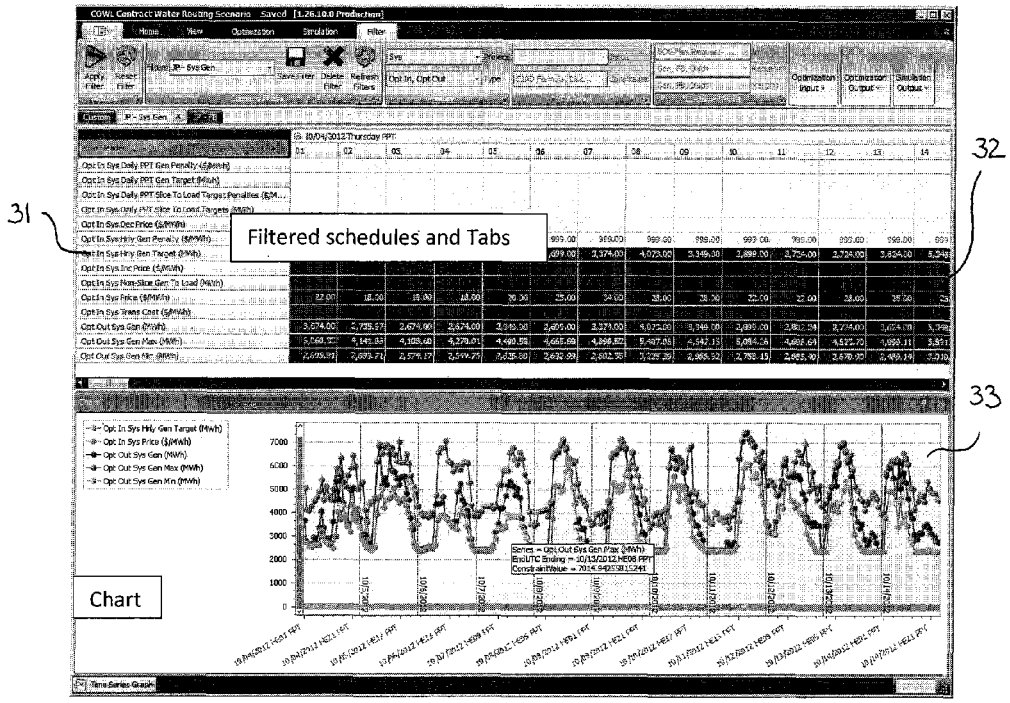
FIG. 4 is a screen shot of one embodiment of the optimizer's graphical user interface, showing the main grid and chart of system performance.

In order to manage the multi-dam hydropower generation system, planners must be able to view the state of the system. The entire system contains over 800 schedules. Referring to FIG. 4, in order to be able to analyze such a large volume of data and make it intelligible within the application and within the allotted time windows, the optimizer system 100 allows its users 70 to build and save filters to limit the amount of data being displayed at one time, and to load those filters into tabs 31 to enable quick switching between filters within a viewing graphic 32. The optimizer system 100 also provides the capability to select certain schedules and display them in the format of a chart 33.

System Operational Features

One feature of the optimizer system 100 is the ability to manage constraints. The main requirement of Slice customers is to manage the system in accordance with the environmental constraints that BPA places on the hydro and generation variables. For example, one set of constraints could be that a particular dam's forebay must be between a minimum and maximum amount for a particular hour. The optimizer solves the system to stay within the BPA constraints for the next ten days, provided that a mathematical solution exists.

However, the requirement to stay within the constraints is based on the inflow forecasts that are also provided by BPA. The inflow forecasts are uncertain and will change on an hour-to-hour basis. Therefore, if a solution is found that stays within BPA's environmental constraints at a particular time, this does not guarantee that there will be a solution that can stay within the environmental constraints should the inflow forecasts change significantly.

Figure 5:
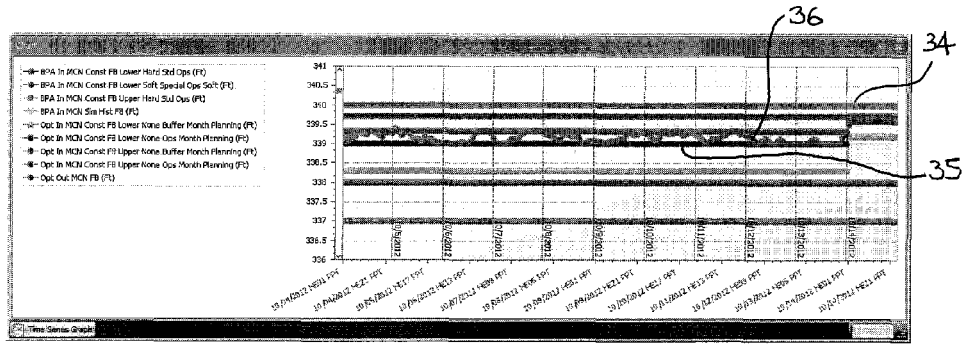
FIG. 5 is a screen shot of one embodiment of the constraint management, using the McNary Forebays as an example.

Therefore, the optimizer system 100 allows planners to set their own constraints that are more constraining than BPA's so that the planners can create buffers between the optimizer solution and BPA's constraints. An example for McNary's 3 forebays is shown in FIG. 5. The outer horizontal lines represent BPA's maximum and minimum forebay constraints 34. The inner horizontal lines represent the planners' constraints 35, and the optimization line 36 represents the optimizer's solution for the McNary forebay for the next ten days.

The optimizer system 100 also enables its users 70 to manage requirements under the Federal Power Act. Since the Slice contract turns over the management of a portion of BPA's system to Slice customers, BPA has instituted a "Slice-to-Load" requirement, also known as an RSO test, to ensure that BPA's power is flowing to the local utility's customers. The RSO test involves a fairly complicated calculation to determine how much Slice contract generation must be delivered to each Slice customer's load on a monthly basis. Planners are tasked with planning for and tracking this number in order to ensure compliance.

The optimizer system 100 contains functionality to assist the planners in their Slice-to-Load management on a planning (future) basis. This functionality allows planners to specify a quantity of power that should be delivered to load on a daily basis, as well as the amount of non-Slice hydropower generation that is forecast to be delivered to load. In combination with the load forecast, the optimizer system 100 can then allocate the Slice hydropower generation on an hourly basis in a manner that attempts to comply with the planner's request.

The optimizer system 100 enables its user 70 (shown in FIG. 11) to manage reservoir storage. The principal role of the planner is to plan the management of the hydro storage reservoir behind the Grand Coulee 1 dam. Management of this dam is the focus of the system because this is the only dam of the six that has long-term storage capability. The other dams typically have only enough storage to store and discharge water within a single day. By contrast, the Grand Coulee 1 is able to store water seasonally and will tend to fill in spring, empty in summer, then move up and down through the fall and winter.

Management of the Grand Coulee 1 dam takes place primarily on a monthly planning basis. The planners will chart storage levels based upon expected inflows, uncertainties on those inflows, prices, and expectations of future values of environmental constraints. While these plans are made on a monthly basis, they are implemented on shorter time frames. Therefore they need to be facilitated through the optimizer system.

Figure 6:
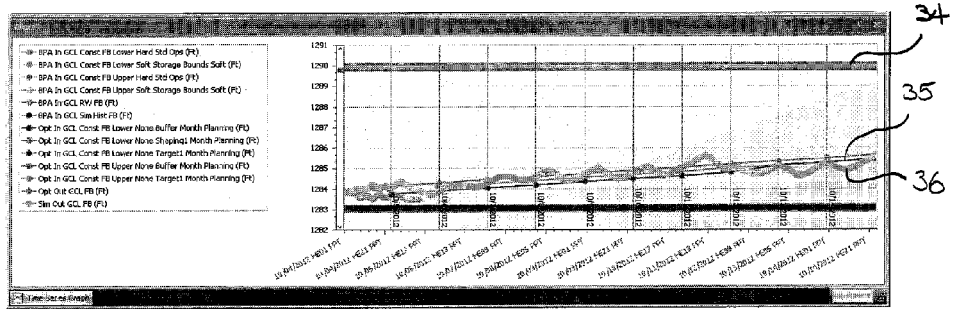
FIG. 6 is a screen shot of one embodiment of the management of the Grand Coulee storage.

FIG. 6 shows Grand Coulee's 1 forebay 26 along with the BPA environmental constraints and planner constraints 35. The outer constraints are BPA's minimum and maximum environmental constraints 34. The dots along the diagonal lines are the planner constraints 35 to keep the Grand Coulee 1 forebay following the plan (to fill storage in this case) through the next ten days. The optimizer system's solution line 36 for the forebay 26 is indicated in FIG. 6.

The optimizer system 100 enables its user 70 to manage uncertainty inherent to the hydro system. Everything that the planners do is subject to uncertainties, particularly uncertainties in inflows. The most robust way to handle this uncertainty would be to perform a stochastic optimization with the inflows modeled stochastically. However, due to the real-time time constraints, such an approach is not workable. Instead the optimizer system 100 facilitates a scenario based approach to managing uncertainty.

The optimizer system 100 contains a feature called "analysis optimization" which allows its user 70 to modify inputs and run an optimization based upon hypothetical scenarios. In this way, the planners and traders can vary the inflows up or down to determine whether the proposed plan will still result in the desired results under those different assumptions. They can then adjust their plans accordingly.

The optimizer system 100 enables its user 70 to engage in forward trading. Power trades in a variety of markets. The forward markets that are relevant for the timeline with which the optimizer system 100 is concerned are the day-ahead market (DA) and weekly or balance-of-month (BOM) markets. Generally speaking the forward traders try to hedge the PUD's positions in the forward markets in order to reduce the risk of exposure to real-time prices. The optimizer system 100 enables this process in several ways, namely, by allowing traders to: view their available Slice generation and flexibility; set daily generation targets; impose economic constraints; and analyze different scenarios.

Figure 7:
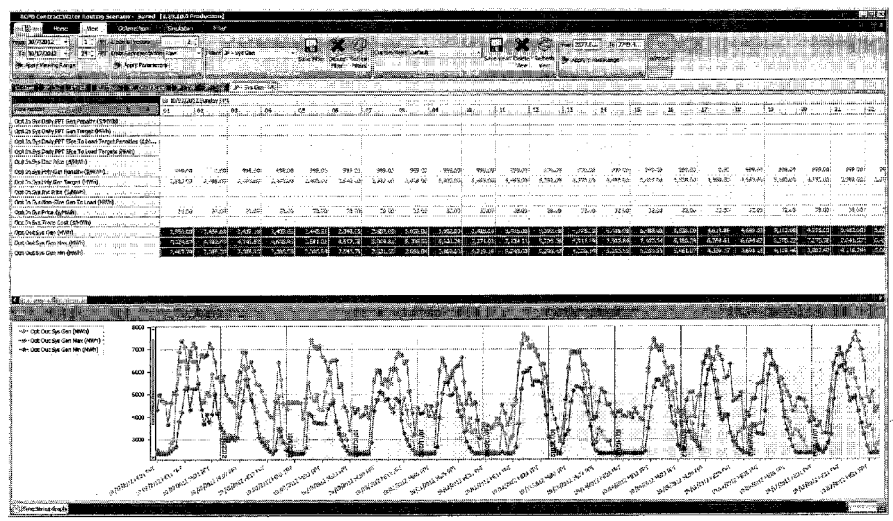
FIG. 7 is a screen shot of one example of the system-level generation position.
Figure 8:
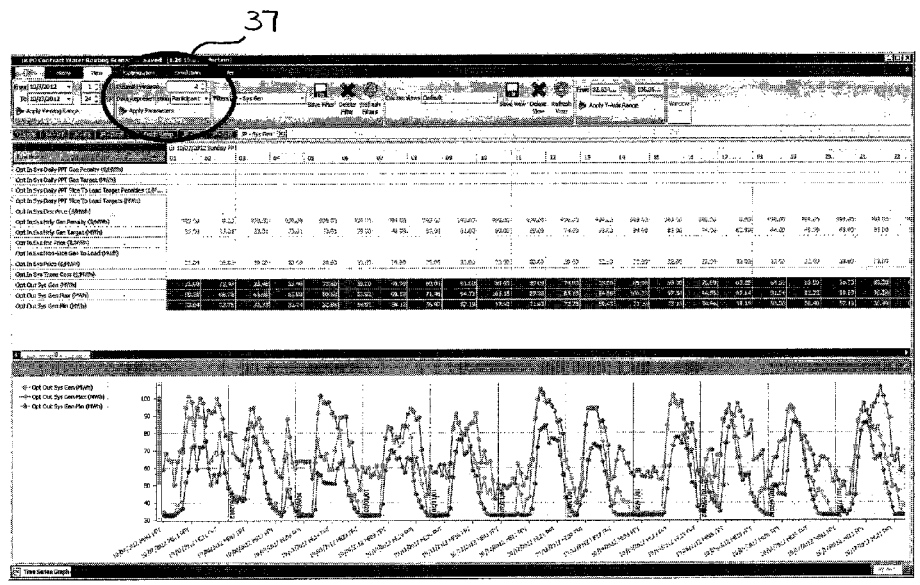
FIG. 8 is a screen shot of one embodiment of the participant-level generation position.

Using the same filtering technology discussed above, traders can see the amount of generation for all of the projects summed up, as well as the maximum and minimum generation available on an hour-by-hour basis. FIG. 7 shows a filter displaying the maximum, minimum and optimal generation for all six projects combined at a system level, for example, for the entire Columbia River 8 system. FIG. 8 shows the same data but after the user 70 has selected to view the data at the participant level shown by the circle 37, therefore multiplied by that Slice customer's 10 percentage.

The optimizer system 100 enables the user 70 to create daily generation targets. As the optimizer system 100 optimizes to a changing set of inputs, such as inflows, constraints, prices, it is desirable to be able to control how much generation the system tries to allocate to particular days. If the traders trade a certain amount for a day in the future, but then, due to price forecasts changing, the optimizer changes the amount of generation allocated to that day, the traders' intention of hedging and reducing risk for that day may be undermined.

Figure 9:
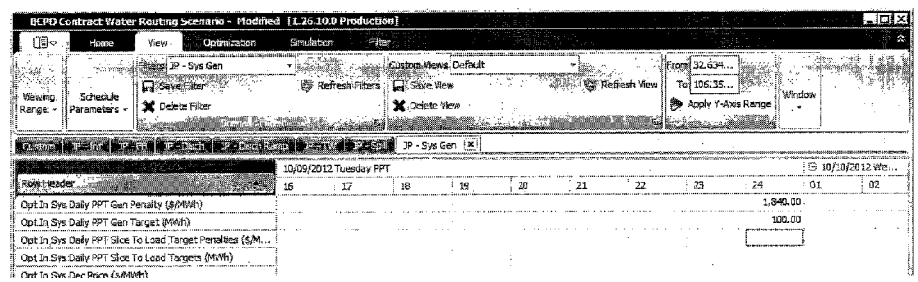
FIG. 9 is a screen shot of one embodiment of the daily generation target.

Therefore, the optimizer system 100 has a function to set a daily generation target, which the optimizer system 100 will attempt to enforce. It will attempt to do so through the use of an economic signal, such as a penalty that the optimizer will suffer for each Megawatt-hour it diverges from the penalty. FIG. 9 shows how the daily gen target is set by placing the total MWh target for the day in the cell for the $24^{th}$ hour of the day, along with the associated penalty.

The optimizer system 100 enables economic constraint management. Since the traders are operating in a realm of uncertainty in trading for future days, the optimizer system 100 was designed to allow the traders to encode economic signals into river operations. This is accomplished by using the same feature that the planners use to build buffers around the BPA environmental constraints, namely by implementing trader constraints. The optimizer system 100 also has the capability to set constraint violation penalties at values that result in different behaviors depending upon price and other signals in the system.

For example, traders may set multiple constraints on important variables, such as forebays. The most constraining constraints will have a fairly low penalty, while the penalties will gradually become larger as the constraints become less constraining. Therefore, under a low price regime, the optimizer system 100 will keep the watershed system on a conservative track, whereas if prices increase or decrease markedly, the optimizer system 100 will allow the river to deviate from the more conservative track to take advantage of those prices.

Just as for the planners, the traders also have to perform their jobs in the face of uncertainty in inflows and in prices. They therefore will also be in a position to use the analysis optimization functionality to run the optimizer system 100 under hypothetical scenarios to determine how the hydropower generation system would respond. Based upon those analyses, the trader may determine to trade more or less depending upon how they view the probabilities of various outcomes and the response of the hydropower generation system to those outcomes.

The optimizer system 100 enables real-time trading. The most challenging business processes to meet were those belonging to the real-time trading function. Real-time trading operates on an hourly cycle. Within that time frame, the Slice customer 10 must determine the needed supply and demand positions, trade any surplus or deficit positions, schedule the power flows from sources to sinks, and fulfill all of their requirements to notify BPA and other relevant parties of their plans for each hour. Should the Slice customer 10 fail to do any of these functions correctly, it is subject to potentially large financial penalties. One embodiment of the optimizer system 100 has been designed to support these stringent, time-dependent processes.

Ultimately, the economic benefit that derives from the Slice contract is determined by how the water is actually used. The optimizer system 100 therefore gives the traders a number of tools to drive the economic dispatch of the hydropower generation system. First, the optimizer system 100 will optimize to price signals. Hourly prices times hourly generation is one component of the optimization utility function.

In order to perform an optimization, as opposed to just solving a system of linear equations that has a single solution, there must be a standard that forms the basis of the optimization. In the case of the present optimizer, that standard is called the "utility function." Roughly speaking, the utility function is a mathematical representation of a predetermined desired level of output. In many embodiments, it is convenient to correlate the utility function to a desired level of profit or revenue for mathematical convenience. In actuality, there are other components to the utility function, such as if a constraint is violated then the utility function incurs a cost which is equal to the amount of the violation times the dollar penalty per violation per MWh. These constraints, in effect, act as mathematical buffers around the BPA constraints.

Another component of the utility function places values on both incremental and decremental generation capacity. That is, there is an incremental price and a decremental price, and these are multiplied by the incremental capacity, which is the difference between the maximum generation and the scheduled generation, and the decremental capacity respectively.

Finally, because there is often a difference between the price one pays to buy power and the price one is paid for selling power known as the "bid-ask spread", the optimizer system 100 allows the traders to set a transaction cost to reflect the difference between the price and one-side of the spread. The optimizer system 100 imports information about the rest of the supply and demand for each customer, so that it knows when Slice generation is narrowing the difference between overall supply and demand (and so lowering transaction costs) and when it is widening it (and so incurring transaction costs).

Balancing Positions

The primary job of the real-time traders is to ensure that the amount of power being generated matches the amount of power being used on an hourly basis. The optimizer system 100 supports this process in a number of ways. First, because the Slice contract is but one part of the Slice customer's portfolio of energy sources, the optimizer system 100 has API's that allow it to interface to a variety of other systems. These interfaces allow for the importing into the optimizer system 100 of load forecast data for a load forecast system; purchases, sales, and other generation from a scheduling system; and price forecasts from a price forecasting system. As one example, the optimizer system 100 could interface with other, commercially available scheduling systems such as ACES, Allegro, or OpenLink.

Figure 10:
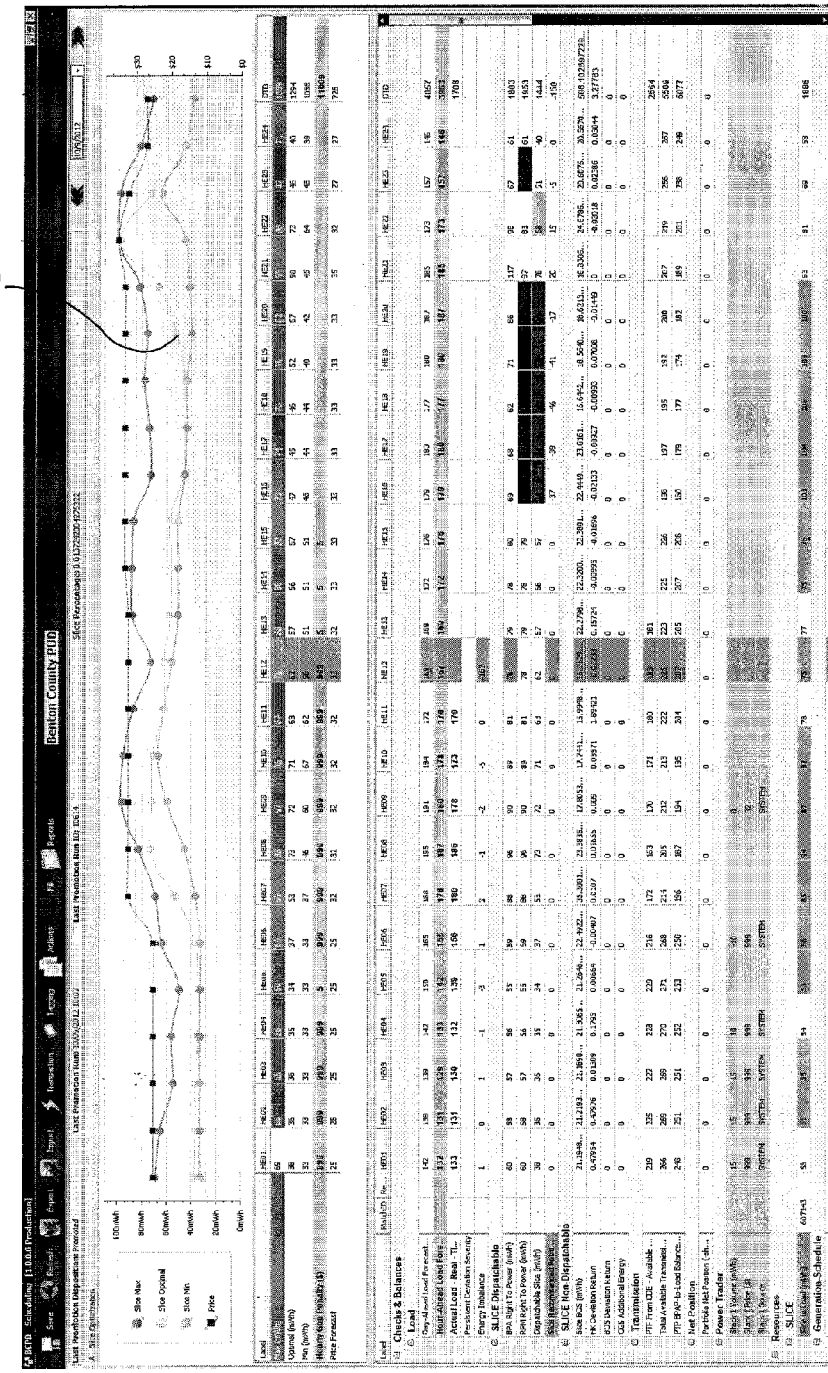
FIG. 10 is a screen shot of one embodiment of a scheduling tool with chart of Slice generation and prices.

The interface also provides a methodology whereby a scheduling system can initiate an optimization or an upload to BPA's system of the resulting schedules, and receive the results and any messages back from the optimizer or from BPA. In this manner, traders can view their entire portfolios and manage their Slice contract from a single location. FIG. 10 shows a view of one embodiment of an exemplary scheduling tool with a chart of the Slice contract position.

Another method by which the optimizer system 100 supports balancing positions is by allowing a trader to input an hourly generation target. This generation target amount is a component of the utility function. The traders have the capability to adjust the penalty associated with this generation target so that the trader can set a high penalty to ensure that the optimizer system 100 prioritizes hitting the generation target over optimizing to price. The trader can set a lower penalty to incorporate the generation target into the overall optimization but not necessarily disregard prices.

Figure 13:
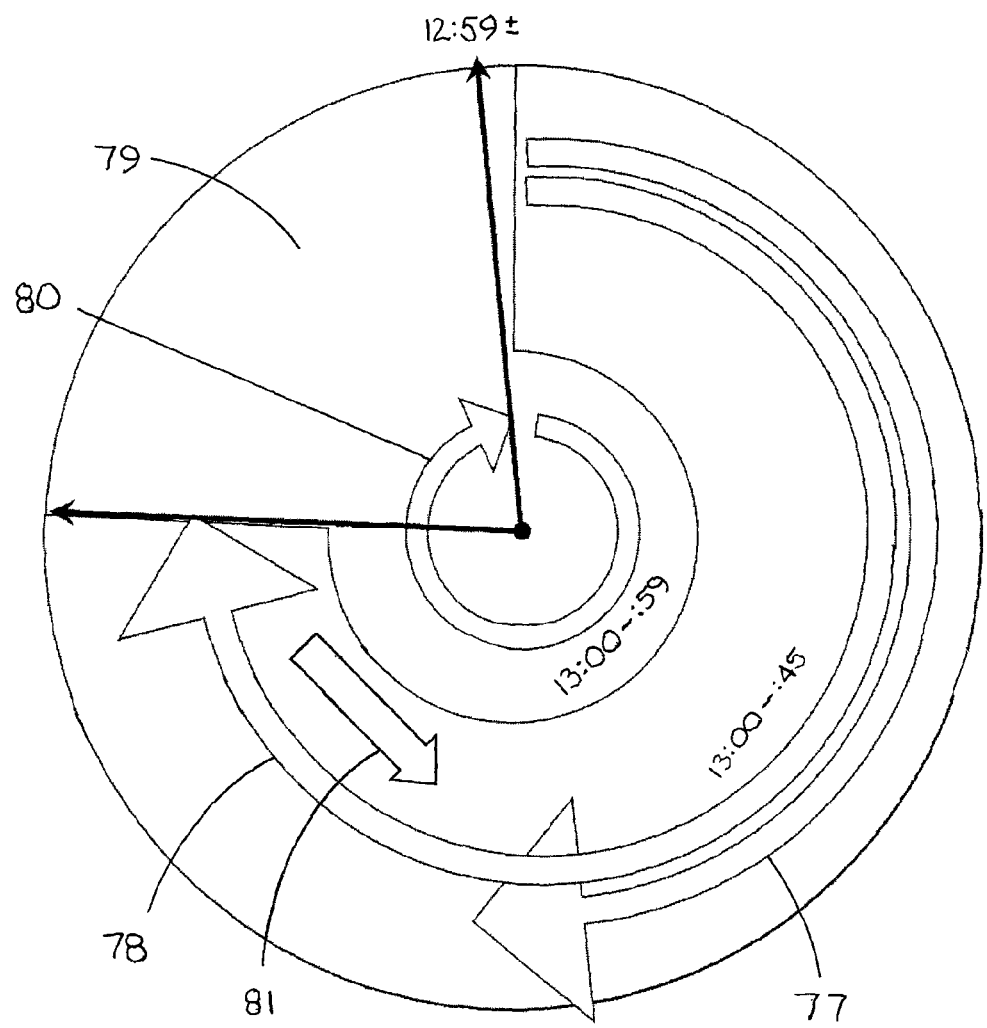
FIG. 13 shows a graphical representation of BPA's hourly scheduling clock.

Finally, the optimizer system 100 supports the balancing process by performing its work quickly. As mentioned previously, the key design criterion for the optimizer system 100 was to be able to produce feasible schedules quickly to enable the traders to economically manage multiple Slice customer 10 portfolios simultaneously. FIG. 13 shows the typical hourly process. In order for the traders to perform their jobs within the allotted time, it is necessary that the optimization process be completed within minutes.

Table 2 shows the performance of the optimizer system 100 based on a few days of testing. The optimizer system 100 is able to accomplish this performance first and foremost because of the global linearization technique described below. There are two other features however that also supports realizing this performance. The first feature is known as the AutoRun. This is a process that is automatically kicked off just prior to the top of the hour as soon as BPA publishes the new environmental constraints, history, and inflow data for the next hour and beyond. This process initiates optimizations where schedules for the entire ten-day window are allowed to vary to find the optimal solution given the inputs and constraints. As can be seen in the table, this process takes approximately one minute per Slice customer.

TABLE 2

| Day | BPA Final Simulation Count | Final Fully Feasible Count | Final Feasibility Percentage | AutoRun Optimization Duration | Real-Time Optimization Count | Real-Time Optimization Duration |
|---|---|---|---|---|---|---|
| 1 | 216 | 214 | 99.07% | 1:03 | 279 | 0:09 |
| 2 | 216 | 206 | 95.37% | 0:55 | 351 | 0:10 |
| 3 | 216 | 212 | 98.15% | 1:02 | 396 | 0:08 |
| 4 | 216 | 213 | 98.61% | 1:06 | 491 | 0:07 |
| 7 | 216 | 214 | 99.07% | 1:07 | 456 | 0:07 |

It is also the case however that the traders need to be able to adjust the Slice contract dispatch to meet the objectives laid out above. Dispatchers therefore will often need to optimize again once they know the results of the optimization with the new data from the top of the hour. A key point about the real-time traders is that they are primarily focused on what the system will be doing in the next few hours, with little concern about the schedule several days hence. With that in mind, the optimizer system 100 implements a technique called "stitching". Stitching takes all the hours beyond the stitching period (typically 2 days) and constrains the optimization further such that the fixed variables are not allowed to vary from the previous, ten-day optimization result. This technique leads to much shorter optimization times as can be seen in the last column of Table 2.

I. System Design

Figure 11:
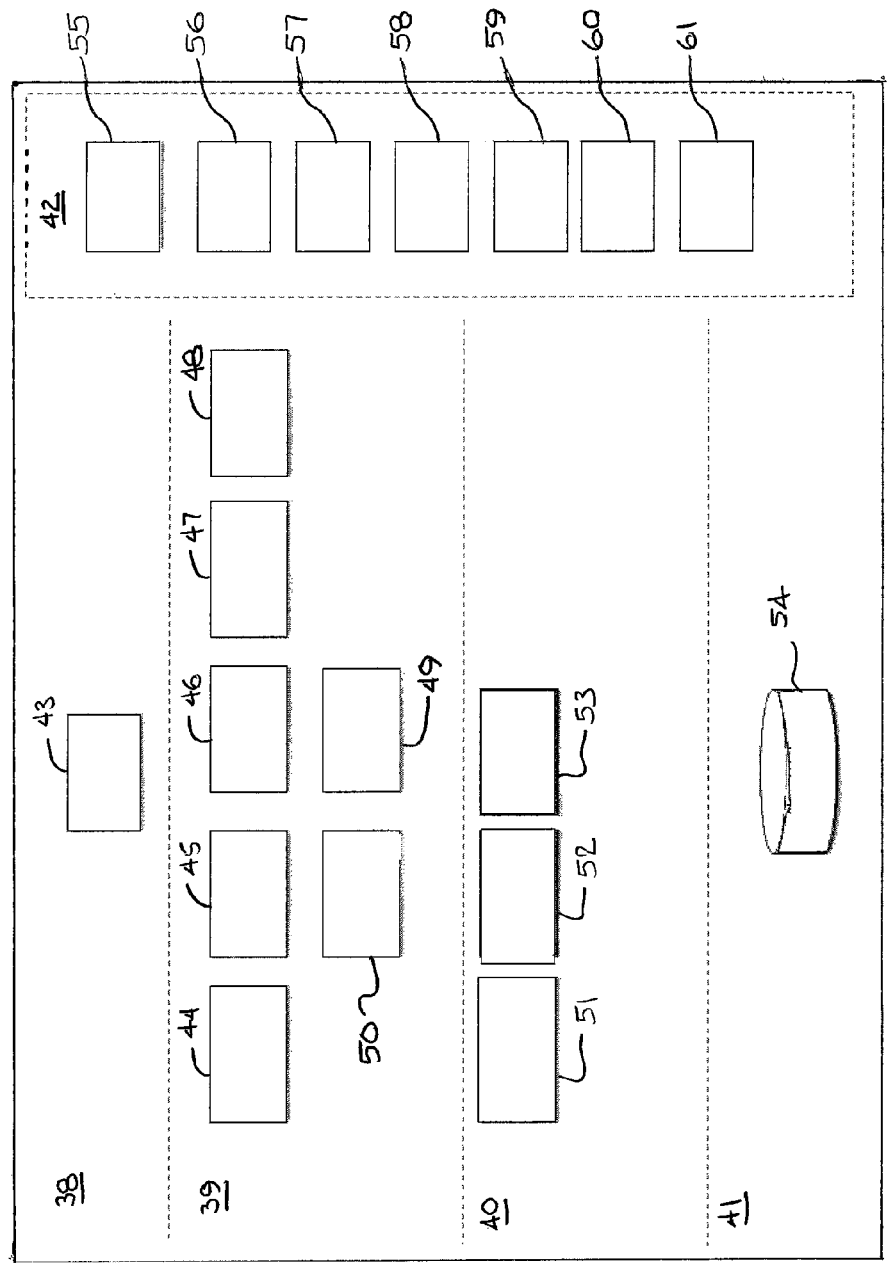
FIG. 11 shows a schematic of one embodiment of the system architecture.

FIG. 11 shows one embodiment of the optimizer system 100 architecture, which comprises clients, managers, engines, data access, and the physical SQL database storage. In the following discussion, the overall system architecture follows the The Method approach from IDesign (www.idesign.net). This example is used for illustration of the system, and not for limitation.

The exemplary architecture comprises a static architecture presentation 38, business logic 39, data access layer 40, a database layer 41, and utilities 42. The architecture solution is broken down into a number of modules. For example, the water routing client 43 is a windows type application (using the WinFormtool) that is hosted on a server and then exposed to the user 70 via a secure remote access application, such as Citrix or the like. The business logic 39 is handled via a series of managers that are designed to handle a set of logically and technically related sets of processes. These managers could include, for example, a scenario manager 44, an optimization manager 45, a simulation manager 46, a configuration manager 47, a notification manager 48, a CFI engine 49, and an optimizer engine 50. The optimizer engine 50, for example, is tasked with building the optimization model and initiating the optimization. The simulation manager 46 is tasked with gathering the data required to be passed to BPA and receiving and routing the responses from BPA. Finally, the data interchange between the managers and the database 54 is handled through the data access layer 40, which comprises functionality such as water routing data access 51, RPM data access 52, and archives data access 53. The database 54 is a relational database (such as SQL Server) which contains tables, views, stored procedures, triggers, index, and functions.

A non-limiting specific example of this architecture is as follows:

Window client application
    WinForm application exposed through secure Citrix session Optimizer Managers
    Encapsulate different Use, Uses, or User stories, and filter and direct specific services calls into different engines Optimizer Engines
    Specific modules that implement business logic Data Access
    A gateway to allow callers to save or retrieve data from the data store Physical SQL database
    Contains SQL tables, views, store procedures, triggers, index and functions In addition to the core modules, the optimizer system 100 also includes utilities 42 to integrate all the pieces together. An example of such utilities 42 is BizTalk 55, host (IIS) 56, logging 57, security 58, pub/sub 59, reports 60, support 61. For example, a pub/sub 59 system carries the communications amongst the different modules. Individual systems will publish messages to the rest of the system, or the entire solution space. Other individual systems are set up to subscribe to relevant messages and react to them. As another example, a security 58 system is driven from a corporate security system. Individual logins and authentication are passed from the corporate network security to the application. Additional permissions within the application are also triggered based on the network security model, and within the optimizer system 100 these permissions are managed at the user 70 and group level.

Figure 12:
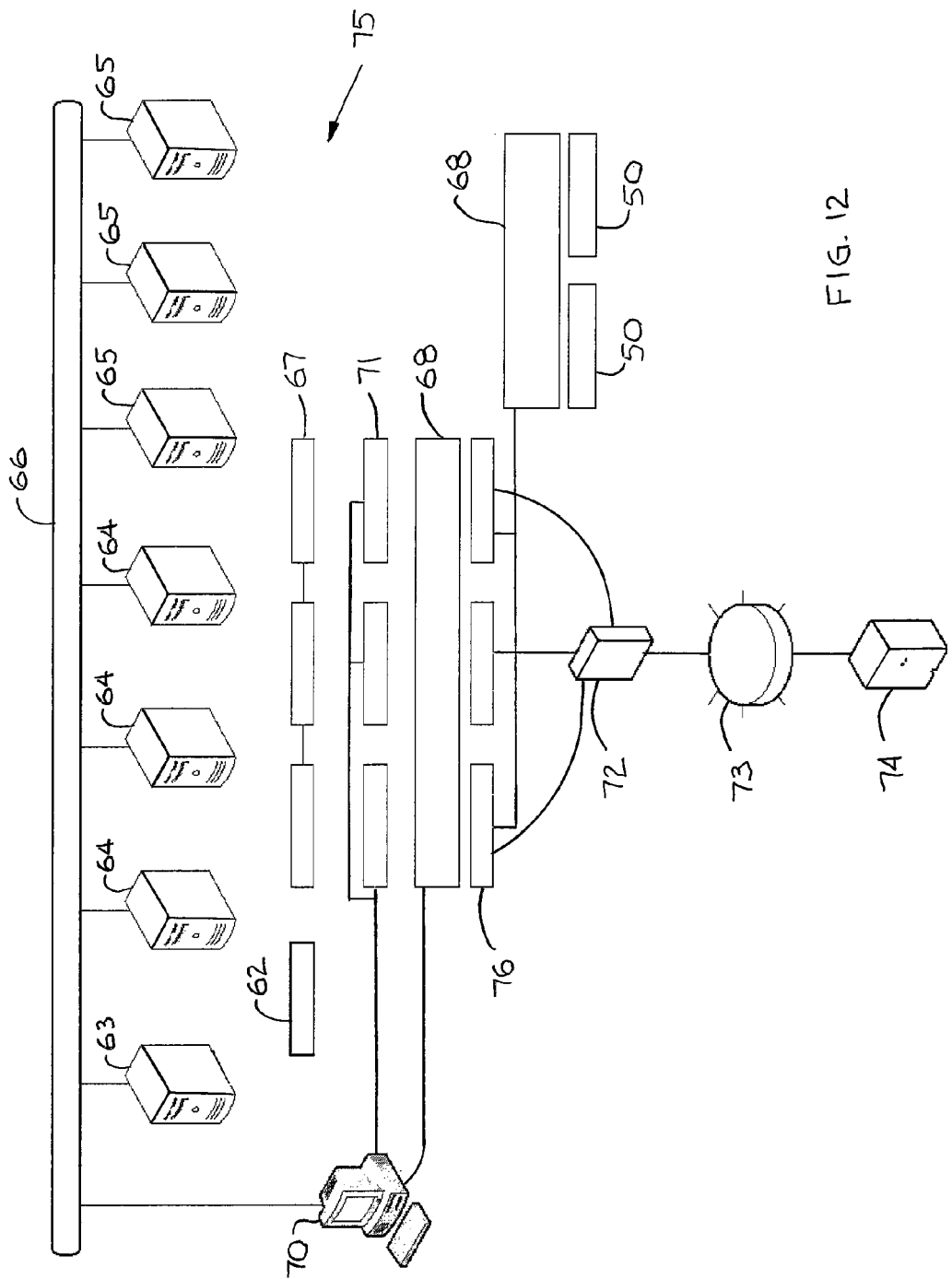
FIG. 12 shows a schematic of one embodiment of the system architecture.

FIG. 12 shows an example of one embodiment of the configuration of the computer system 75 that forms part of the optimizer system. In this embodiment, the computer system 75 comprises a client application 62, a client application dispatcher 63, one or more application servers 64 and one or more optimization servers 65 operatively connected via a communication network 66, a caching system 67, at least one load balancing server 68, and communication connectivity 73 to the BPA system via BPA's CFI 74. A user 70 of the system is connected to the system via the communication network 66, which is one or more of a local area network, a wide area network, a wireless network, or other such communication network.

The client application dispatcher 63 is an application dispatching server that contains the latest production version of client applications and services. When the user 70 launches the application through a remote session, such as Citrix for example, it will dispatch it from a single client application dispatcher 63 server to make sure the user 70 is running that latest version.

The application servers 64 contain the application executable instructions for the applications. The specific applications are hosted under internet services, such as IIS services. Optimization servers 65 contain the executable instructions for the optimizer engine 50 to build the optimization MIP model, solve the model using the computer-based solver, and output results. Caching system 67 comprises the functionality to cache all WCF services requests and responses. Caching the response or scenario form in the operator solution greatly reduces unnecessary round trip to fetch static data from the database 54. Notification system 71 comprises the functionality for the publish and subscription services, which allow different services to broadcast and subscribe to messages.

Load balancing server 68 comprises the executable instructions and functionality for content caching and switching servers. The load balancing server 68 directs services call traffic, particularly optimization request, to different services end points in the computer system 75. BPA system is accessible via the BPA customer facing interface ("CFI") 74, which is one of the two access gateways to retrieve BPA environmental constraints and other input data 101 and submit simulation schedules. The computer system 75 connects to the CFI 74 via an external communication network 73, such as the Internet, a wide area network, or the like. Optionally, the computer system 75 comprises a firewall 72 between the computer system 75 and the external communication network 73.

In each of the servers discussed above, the server comprises at least one processor operatively associated with at least one memory, wherein the memory comprises instructions that when executed by the processor causes the processor to perform the functionality associated with the server as described above. The memory may be volatile or non-volatile.

II. Scheduling Parameters

The optimizer system 100 operator's scheduling activities within the 60 minutes window are closely tied to the BPA scheduling clock. FIG. 13 shows BPA's publication cycle for information needed for scheduling the Slice contract. BPA has laid out the following timeline to handle the flow of data back and forth between the Slice customers and BPA, as well as to set deadlines for when various steps must be done by the Slice customers and by BPA.

II.A. Data Flows

BPA is obligated to provide the information, such as environmental constraints, needed for Slice customers 10 to manage the Slice resource on a set schedule. The schedule begins at 0:54, six minutes before the top of the hour, for information that is needed for the scheduling hour that begins 1:06 hours hence (e.g. the BPA environmental constraints are made available beginning at 12:54 for schedules for the hour 14:00-15:00). The first BPA environmental constraint information set is produced by the running of BPA's auto-run process 80. BPA's auto-run process 80 takes the newest environmental constraint information gathered by BPA on reservoir levels, inflows, constraints, and other parameters and runs the most recently submitted Slice customer 10 schedules through the BPA simulator using the new environmental constraint information. BPA then makes the results of the auto-run process 80 and the new environmental constraint information available to the Slice customer 10 at around the 0:54 mark.

BPA releases interim publications of more recent environmental constraint information to the customers at two later times within the hour. At +1:15 and +1:27 BPA publishes environmental constraint information on what happened in the most recent, past hours, as well as new environmental constraint information about inflows. In particular, new environmental constraint information includes the following hour's storage offset adjustment ("SOA") for inflows at each of the projects, and any other changes that have happened since the previous environmental constraint information release. Finally, BPA has the option to publish changes to the environmental constraints and operation parameters at any time, but such changes do not affect the first two scheduling hours.

II.B. Scheduling Deadlines

BPA imposes schedule deadlines on the Slice customers to submit schedules to BPA. First, for the next hour, the Slice customer 10 cannot begin to promote new schedules (that take into account the new environmental constraint information provided at six minutes prior to the top of the hour) until the beginning of the hour, therefore, at +1:00. Slice customers have a participant window 78 until forty-five minutes after the top of the hour (+1:45) to promote schedules, with the last quarter of the hour being a promotion lockout period 79. However, Slice customers must also tag their schedules during the tagging period 77, which ends at the bottom of the hour (+1:30). So, effectively, the Slice customer 10 cannot change their schedule for the next hour (+2:00-+3:00) after +1:30.

In summary, one example of the key BPA hourly activities comprises:

BPA auto-run completes around XX:54

Hour XX+1 schedule window starts at XX+1:00

BPA can update environmental constraints and operation parameters at any time but they will not impact the first simulation hour or HE XX+3

BPA updates after-the-fact schedules, new inflow forecast and SOA (Storage Offset Adjustment) at XX+1:15 and XX+1:27.

BPA transmission's tagging window closes at XX+1:30

BPA closes simulation promotion window at XX+1:45

Referring again to FIG. 13, the operator is mapping its own optimization activities based on the BPA clock. The most critical event is when the BPA auto run process 80 is completed at 0:54, which gives a clear signal to the operator to obtain the latest BPA environmental constraints, operation parameters, last run results, project position, and inflow forecast. The operator then introduces this information into the optimizer engine 50 to commence the operator's auto optimization runs for each Slice customer 10. Once the operator's auto optimization is complete, the optimizer system 100 publishes a complete event notification to the Slice subsystems. The operator scheduling system then imports the optimal series, balance other resources and obligations, and allow the operators to re-optimize the solution using the stitching optimization 81. The optimizer hourly schedule includes automated and non-automated processes, described below.

An example of the key operator hourly activities includes:

Operator polls BPA notification every two minutes

Operators set hourly generation targets, update prices and transact early trades between XX:45 and XX+1:00

The operator auto run begins immediately following publication of the BPA auto run notification around XX:45

Operator auto run consists of fetching BPA data, running a ten-day optimization, and promoting the ten-day optimal series to BPA CFI services After the operator auto run provides a ten-day baseline solution, the operator uses the stitching optimization 81 to only optimize from the next scheduling hour HE XX+3 to the balance of the following day at HE 24

Operators continue to adjust forecast, trade, submit tags, re-optimize and promote until XX+1:45. All promotions to BPA however, have to be from the next scheduling hour HE XX+3 to HE24 on the $10^{th}$ day II.C. Automated Processes Because BPA may publish changes at any time, the optimizer system 100 polls BPA for new information every two minutes. The operator's optimizer system 100 also includes its own auto-run that is triggered to begin after the BPA auto-run process 80 completes (at 0:54). The operator's auto-run consists of a number of steps. It first retrieves the results of the BPA auto-run process 80 and saves them into the optimizer system 100 database 54. It then initiates a full ten-day optimization. After this first optimization is complete, it then submits the schedules that result from the optimization to BPA for promotion.

II.D. Non-Automated Processes

As a result of the BPA clock and the timing of the operator's automated processes, the traders have fairly constrained windows within which to complete their optimizer-related tasks. The hourly power market is most liquid in the last quarter of the hour (i.e., 0:45±1:00) for the subsequent hour (+2:00±3:00), and so the traders will try to lock down their Slice schedule for that hour as much as possible before the auto-runs are completed. BPA locks out participants from promoting schedules during the promotion lockout period 79 in the last quarter of the hour, so the traders must do their own promotions and optimizations for the +2:00 hour prior to 0:45.

After the auto-runs are complete, it is often the case, primarily due to SOA adjustments, that the schedule that the traders had generated prior to 0:45 is changed by the auto-run. The trader must then try to modify its schedules and/or go to the market to ensure that its overall portfolio is balanced. If the trader chooses to modify its schedules then the trader will use the stitching optimization 81 (described below) to run fast, two day optimizations. Once their schedules are set and their trades are done, the traders must complete all tags prior to the end of the tagging period 77 at the bottom of the hour (+1:30), and then begin the process again for the next hour.

Table 3 combines both BPA and the operator activities into a single table format.

TABLE 3

Hourly Scheduling Activities

| Time | BPA Activities | Operator Activities |
| --- | --- | --- |
| XX:54 | BPA auto run process 80 completes | |
| XX:55 | | Operator kicks off its auto run |
| XX:57 | | Operator auto optimization completes. NOTE: The operator auto run must wait until top of next hour before it can promote to BPA |
| XX+1:00 | | The operator promotes HE XX+3 simulation to BPA |
| XX+1:00 to XX:+1:15 | | The operator's users 70 can re-optimize and promote to BPA |

TABLE 3-continued

Hourly Scheduling Activities

| Time | BPA Activities | Operator Activities |
|---|---|---|
| XX+1:15 | BPA publishes real world (RW) environmental data, such as after the fact forebay, power generation, discharge, inflow, and SOA | |
| XX+1:27 | BPA publishes new constraints and potentially late arrival RW data | |
| XX+1:30 | | The operator's user 70 submits the last Slice transmission tag schedule to BPA for HE XX+3 |
| XX+1:45 | | The operator's user 70 submits the last promotion run to BPA for HE XX+3 |
| XX+1:45 to XX+1:54 | | The operator's user 70 updates trade positions, trade signals, load forecast, purchase and sales transactions. |

III. The Slice Solution

Figure 14:
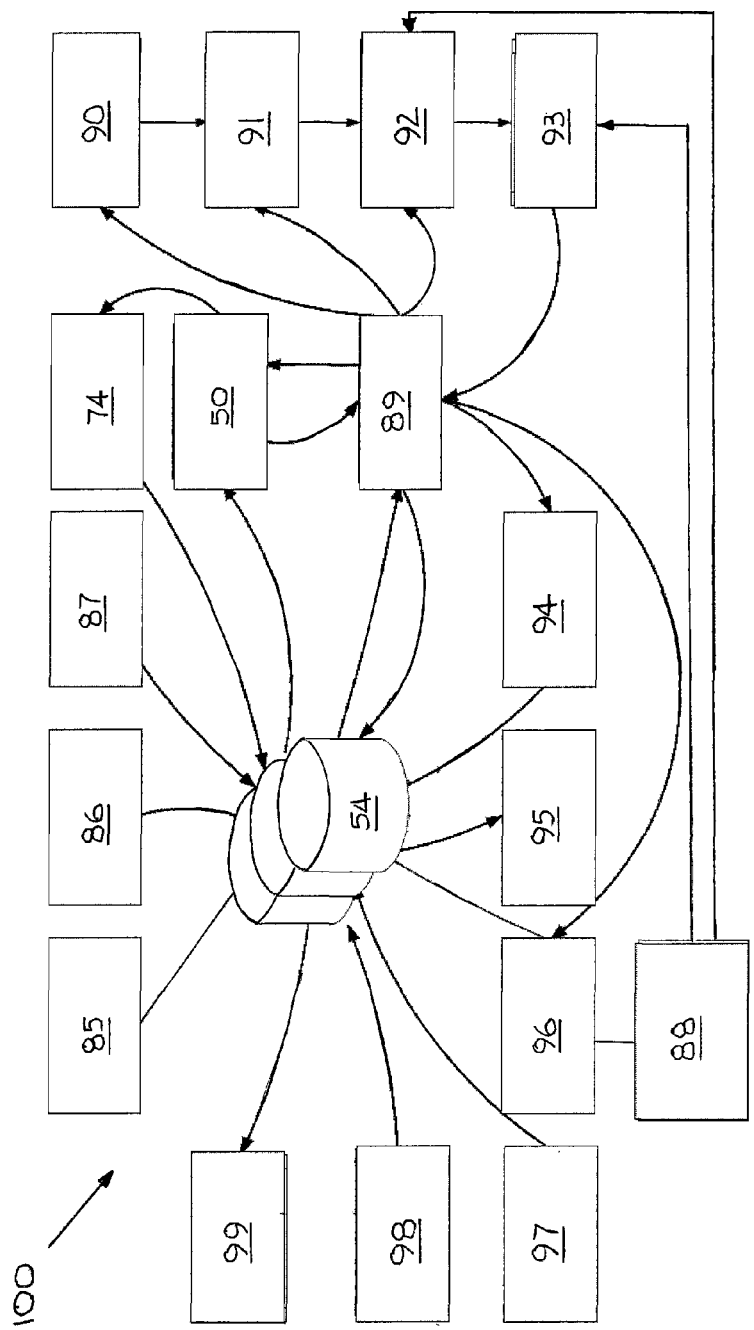
FIG. 14 shows a schematic of an exemplary optimizer system solution.

FIG. 14 illustrates one embodiment of the Slice sub systems and data workflows. In this embodiment, the Slice solution is database 54 driven. Data are stored in the databases 54 for operation, reporting, and analytic purposes. The two highlighted subsystems, the Slice optimizer engine 50 and the resource and portfolio management 89, are the two components of managing the Slice contract. As shown in FIG. 14, this embodiment of the Slice solution further comprises the following systems and sub-systems.

The price forecast 85 systems provides price forecast information for the optimizer engine 50 based on local and regional price index and discovery. The inflow forecast 86 system provides environmental constraint forecasts such as stream or flow forecast into the MIP model to calculate water available and value. Most embodiments of the MIP models rely on BPA ten-day inflow forecasts, but longer forecasts are possible. The reporting 87 system allows users, internally and externally, to generate operation reports, planning reports, after the fact reports, and even analytic reports of optimizations, schedules, and other useful information. The CFI 74 is as described above. Generally, the system operator calls the CFI 74 to acquire environmental constraints and other operation parameters, and to submit promotion runs, trials runs, and full analysis runs. The optimization is performed by the optimizer engine 50.

The resource and portfolio management 89 system imports resources and obligations from different sources, such as the energy trading and risk management ("ETRM") 92 system, load forecast 99 system, and the optimization results. The resource and portfolio management 89 is built with numerous instances of business logic that balance different resources and obligations and direct data flows to different end points and additional processes.

Users 70 use the position manager 90 system to send trade signals to traders. Traders use the trading optimization 91 application to create and transact trades and deals. The ETRM 92 contains system records for trades and deals.

The archive 93 system stores trade and deal information in a database 54 format, such as in SQL database format. The archive 93 system also provides an interface to allow other subsystems to access data. The common desktop environment ("CDE") is a web service through which Slice customers can submit and retrieve transmission related schedules that include load estimates, generation estimates, and energy imbalance schedules.

The alert monitor 95 system is used to receive and display load, generation, and alert information to assist schedulers to better forecast load and generation for the operator's clients. The operator's clients 96 export generation and SCADA readings to the operator. The present embodiment of the computer system 75 also comprises a meter cleaning application 97 that enables user 70 to quickly identify and address meter reading errors. A weather application 98 imports weather data, both actual and forecast, from the weather services to better estimate load consumptions. A load forecast 99 system provides a ten-day load forecast to the optimizer engine 50. A risk management 88 system can be deployed in communication with the client 96 system, the ETRM 92, and the archive 93.

IV. Optimizer Engine

Figure 15:
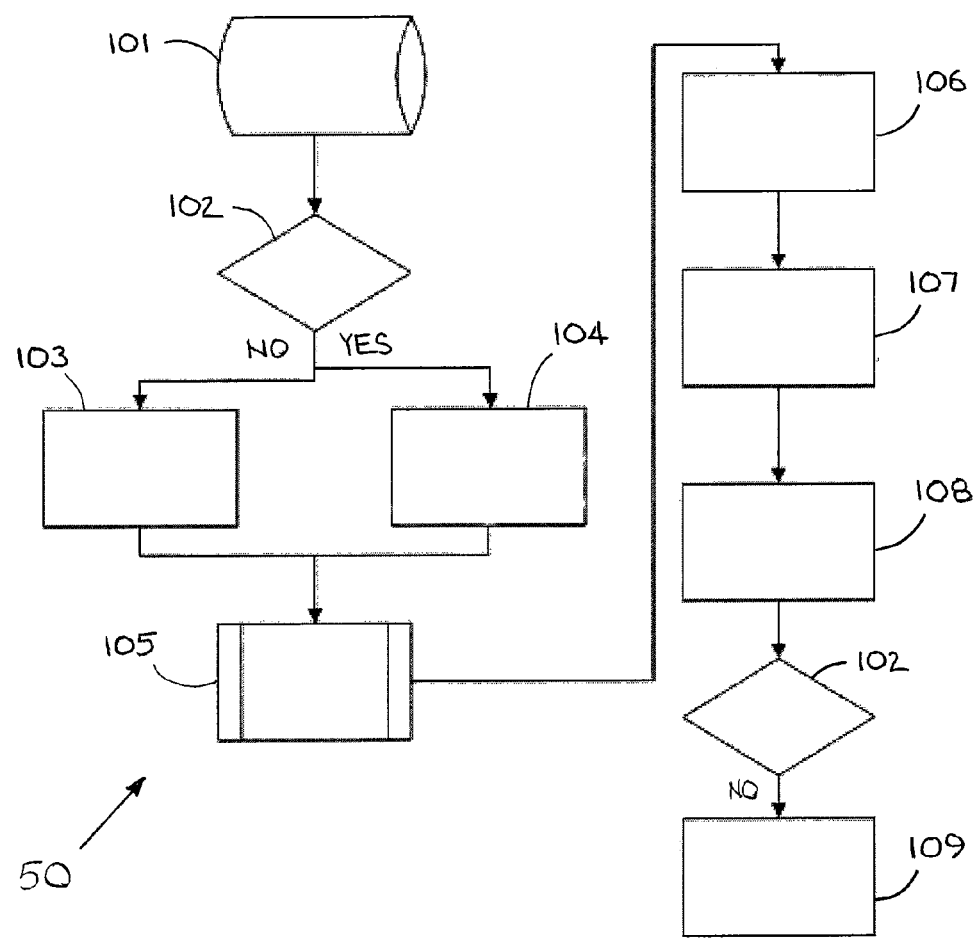
FIG. 15 shows one embodiment of the main optimizer engine workflow.

An overview of one embodiment of the optimizer engine 50 is shown in FIG. 15. Upon receiving all the input data 101, including environmental constraints, user 70 specified generation targets, market and physical inputs, and other economic signals, the optimizer engine 50 solves the entire hydro system and produces optimal or near optimal water routing schedules that satisfy all the environmental constraints. The optimizer engine 50 is also configured to accommodate the volatility of the input data. For example, the environmental constraints obtained from BPA can change quickly, up to several times in an hour, mainly due to imprecise sensor readings. The electricity prices and load forecasts also fluctuate over time.

To optimize a solution in view of the goals and challenges described above, the optimizer engine 50 is designed to be economic driven. The input data 101 is characterized in the form of real-world metrics, such as flow rates, time units, quantities, and other such units as appropriate. The optimizer system 100 uses the optimizer engine 50 to convert the input data 101 from real-world metrics into a uniform metric such that each subset of input data 101 is characterized in consistent units. These consistent units could be, for example, dollar amounts, to create a common base so that the optimizer engine 50 can perform calculations on individual or combinations of input data. For example, a large dollar penalty can be assigned to certain constraint violations to provide a mathematical disincentive for violating the constraint. Meanwhile, penalties can also be assigned to certain conditions to discourage deviations from the generation targets or other objectives that users 70 may define. The optimizer engine 50 is also sensitive to market prices; other than avoiding constraint violations and missing user 70 targets, it will seek the most economically beneficial solution, for example by shifting generation to or from higher-price periods. Intuitively, the optimizer engine 50 can be regarded as a weighing machine. Users 70 are allowed to design strategies with a single objective or combinations of objectives, each weighted according to user 70 preferences, to get the desired optimization results.

From the technical perspective, the entire problem is formulized as constraint optimization; the hydrologic variables along with all the constraints in the input data 101 jointly define a feasible solution space within which the optimizer engine's goal is to produce the optimal (or near optimal) solution according to the pre-specified utility function. Upon receiving all the input data, the optimizer engine 50 compiles them into a linear mixed integer programming (MIP) model, and then feeds the MIP model into a commercial solver capable of producing an optimization based on a set of optimization algorithms. One example of such a solver is the Gurobi solver, which is a state-of-the-art MIP solver produced by Gurobi Optimization, Inc. Other equivalent solvers are also commercially available. After the solver returns the optimized results, the optimizer engine 50 reconverts the optimized results from the uniform metric into the real-world metrics, and verifies them before sending back to the user.

In one embodiment of the optimizer engine 50, the workflow follows the series of steps shown in FIG. 15. The input data 101 is gathered, and an initial determination is made about whether a new MIP model will be created and optimized, or whether a stitching optimization 102 will be run. If a new model is created, the next step is to build the MIP model 103. If a stitching optimization 102 is performed, then the next step is to retrieve the existing MIP model 104 and update the stitching variables as described below. The next step is to solve or compute an optimization 105 using the computer-based solver described below to generate a set of optimized results. The next step is interpreting the optimized results 106, updating the optimized results 107, if necessary, and validating the optimized results 108. At this point in the process, another stitching optimization 102 determination can be made, if desirable. Finally, the optimized results are saved, incorporated into a schedule, and promoted to BPA.

V. Slice Hydro Management System

Referring to FIG. 1, the high level overview of the Columbia River 8 Slice hydro system, the are six dispatchable hydroelectric dam 11 projects. For the purposes of the discussion below, these six hydroelectric dams 11 will be given the abbreviations as follows, in order from upstream to downstream, which are the Grand Coulee 1 ("GCL"), Chief Joseph 2 ("CHJ"), McNary 3 ("MCN"), John Day 4 ("JDA"), The Dalles 5 ("TDA"), and Bonneville 6 ("BON").

V.A. Project Hydraulics

Each of the six projects has the following basic hydro parameters.

| Parameter | Meaning | Scale |
| --- | --- | --- |
| Inflow (Qin) | Amount of water flow into a project | Kcfs |
| Outflow(Qo) | Amount of water flow out of a project | Kcfs |
| Turbine Flow (Qp) | Amount of water flow through the turbines | Kcfs |
| Spill Flow(Qs) | Amount of water flow through the spillways | Kcfs |
| Bypass Flow (Qby) | Amount of water flow through neither turbines nor spillways | Kcfs |
| Generation (Gn) | Total electricity generated from a project or the total system | Mwh |
| H/K | The turbine efficiency factor, measures the amount of electricity generated per unit of turbine flow | Mw/kcfs |
| Forebay(Fb) | The elevation of the reservoir upstream of a dam | Ft |
| Tailwater(Tw) | The elevation immediately downstream of a dam | Ft |
| Volume(Vol) | The volume of the project reservoir | Kcfsh |

All of the above parameters are hourly series by default. For example, Qs(P, t) denotes the spill flow of project P at time t. The expressions below omit P and t whenever the content is clear. These parameters can have either simulated or real world values, as needed or appropriate. Simulated values refer to the hypothetical values used in the optimizer system 100 computer simulation, whereas real-world values indicate the actual point readings or the forecasted numbers.

The real-world values can also be incorporated into the optimizer system 100 input in the form of constraints, such as environmental constraints. A subscript is used to indicate the nature of the parameter. For example, the "sim" subscript in "$Qin_{sim}$" refers to the simulated total inflow while the "rw" subscript in "$Qp_{rw}$" refers to the real-world turbine flow of a project.

For every project at every hour, the following equations are true:

$$Qo = Qp + Qs + Qby \quad (1)$$

$$Gn = Qp*H/K \quad (2)$$

$$Vol = Volp(Fb) \quad (3)$$

$$Tw = Twp(Qo, Fb_{Ds}) \quad (4)$$

Equation (1) indicates that the total discharge is the sum of turbine flow, spill flow, and bypass flow. Equation (2) shows that the total generation is equal to the turbine flow multiplied by the turbine flow efficiency factor H/K. Equation (3) indicates that the volume of the reservoir is a function of the forebay elevation of that project. Note that function $Vol_p$ and is usually nonlinear and is unique for each project p based on the shape of the river basin. Equation (4), referred to as the Columbia Vista formula, is as follows:

$$Tw(Qo, Fb_{ds}) = C_a + C_b(1000Qo)C_c + \max(0; C_d + C_e*Fb_{ds} + (C_f + C_g*Fb_{Ds})\ln(1000q + C_h)),$$

where Qo is the discharge, $Fb_{ds}$ is the downstream forebay and $C_a, \ldots, C_h$ are project specific parameters.

V.B. Stream Flow Logic

The water flows from the first upstream project GCL all the way to the last project BON. There are lags between every two adjacent projects which are assumed in full hours. For five out of six of projects, all the water being released from the upstream project arrives at the downstream project after the lagged period. The only exception is MCN. It is assumed that all the upstream discharge from CHJ arrives at MCN over the course of twenty-four hours. Moreover, as there are several non-Slice projects between CHJ and MCN that are out of BPA's control, for each hour BPA needs to perform periodic adjustment to the MCN inflow, which is called the hydraulic link adjustment. To summarize, the following inflow parameters are relevant:

| Parameter | Meaning | Applied Projects |
| --- | --- | --- |
| Incremental Side Flow ("INC") | The amount of flow from side streams | All |
| The Upstream Discharge ("TUD") | The upstream discharge into GCL | GCL |
| Lagged Upstream Discharge ("LUD") | The amount of flow discharged from the upstream project | CHJ, JDA, TDA and BON |
| Hydraulic Link Adjustment ("HLA") | The flow adjustment at MCN on the upstream discharge from CHJ | MCN |

For every project at some hour:

$$Q_{in} = \begin{cases} TUD + INC, & \text{for } GCL \\ INC + HLA, & \text{for } MCN \\ INC + LUD, & \text{for } CHJ, TDA, JDA \text{ and } BON \end{cases}$$

Here TUD is the total upstream discharge at GCL. LUD of CHJ, TDA, JDA and BON, is essentially the actual discharge of the upstream project a few hours ahead. HLA of MCN is the difference between the lagged CHJ simulated and the real world (or forecasted) discharge average over 24 hours.

V.C. Constraints

BPA enforces many different environmental constraints to regulate the usage of the hydro resources along the Columbia River. All of these environmental constraints can be divided into the following categories.

V.C.1. Point Measurement Constraints

The point measurement constraints only apply to exactly one hour and impose either upper or a lower bound on the corresponding hydro parameters. These are generally environmental constraints, and examples of these constraints include forebay, tailwater, discharge, turbine flow, spill flow, and spill percentage constraints.

V.C.2. Ramp Constraints

The ramp constraints impose an upper limit on the change rate of at least one hydro parameter between adjacent hours or a period of time. For example, there are forebay 24-hour ramp, tailwater 1-hour ramp, discharge 1-hour ramp, and discharge 24-hour ramp constraints.

V.C.3. Average Discharge Constraints

The average constraints limit the average discharges over a course of time. There are discharge 24-hour average, and discharge 7-day average constraints in this category.

V.C.4. Forebay Band/Touch Constraints

Both forebay band/touch constraints apply to a given time interval. The forebay band constraint constrains the maximum range of forebays. The forebay touch constraint enforces that the forebay curve must cross some pre-specified forebay elevation (the "touch point") at least once. That is, forebay is not permitted to be always above or always below the touch point.

V.C.S. Generation Reserve (inc/dec) Constraints

The incremental and decremental ("inc/dec") generation reserve constraint specifies that for every hour there must be some reserved buffers between the total simulated Slice generation and the feasible maximum (minimum) generation induced by all the constraints.

V.C 0.6. Formulaic Constraints

Formulaic constraints are constraints with complex forms that do not fall into any other category. For example, there are five formulaic constraints: GCL tailwater min, GCL 1-hour tailwater ramp down, BON min hourly discharge, BON min daily discharge, and MCN 80% rule.

V.D. Inputs/Outputs

V.D.1. Inputs

Figure 16:
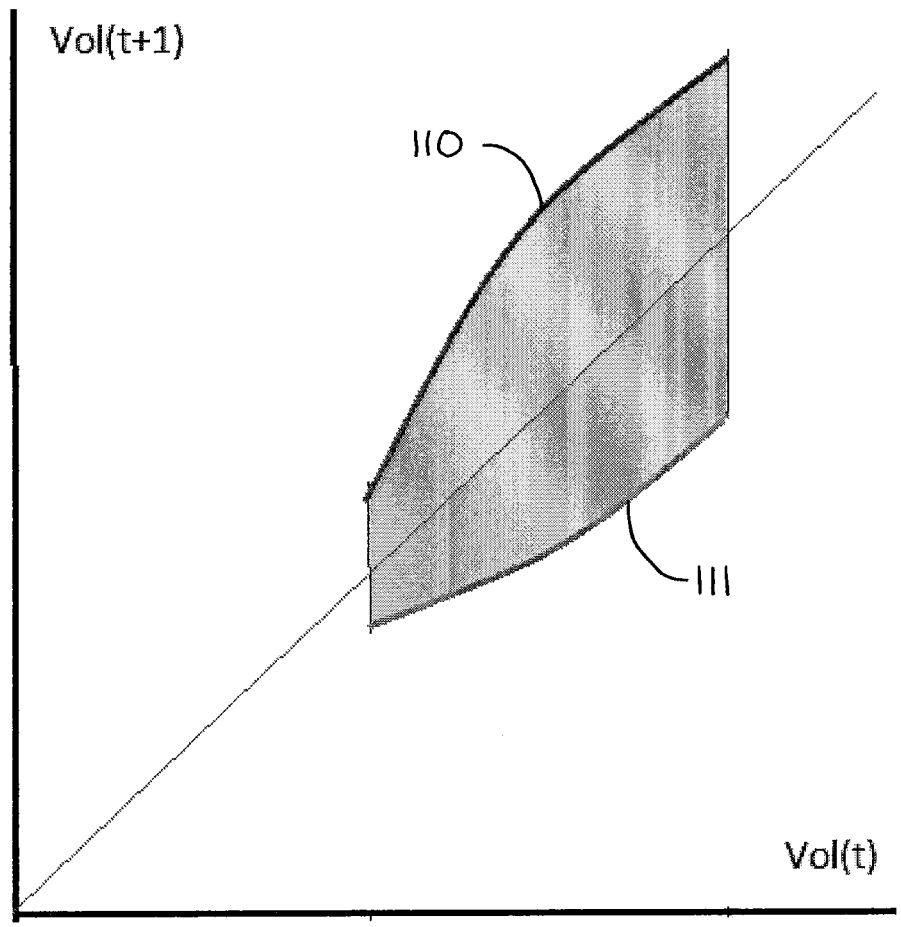
FIG. 16 is a graphical representation of the feasibility region of volume ramp up and ramp down constraints.

FIG. 16 shows the workflow in one embodiment of the optimizer engine. The optimizer engine 50 supports three different groups of input data:

(1) Input data 101 Constraints
    BPA environmental constraints
    Operator constraints BPA environmental constraints are the main shaping tool that BPA uses to ensure the proper usage of the hydro resources. It is always the optimizer engine's top priority to satisfy all the BPA environmental constraints. Meanwhile, users 70 can enter additional customized constraints on top of the BPA environmental constraints to allow customized water routing schedules based on the user's historical demand needs and customized forecasts for energy consumption. The input data 101 can be adjusted so that either the BPA environmental constraints or the operator constraints, or both, are associated with penalties to discourage violation of these constraints during optimization.

(2) Generation Targets
    Hourly Generation Targets/Penalties
    Daily Generation Targets/Penalties
    Slice-to-Load Targets/Penalties The hourly/daily time dependent generation targets specify how much generation the users 70 request on an hourly or daily basis. The users 70 can provide associated penalties for deviating from them. The Slice-to-Load generation targets specify the minimum amount of energy from the six dispatchable projects that are used to meet the load of an individual Slice customer 10 over a certain period of time.

(3) Market and Physical Data
    Electricity price forecasts
    Incremental and decremental prices
    Load forecast/non-load obligation
    Purchase/sales/external generation/non-slice generation to load/non-load obligation The market and physical data include the forecasted electricity and capacity prices, load forecast and non-load obligations for some specific Slice customer. They may also include supplementary information like the projected purchases, sales, external generation, non-slice generation to load, and non-load obligation.

V.D.2. Outputs

After optimization the optimizer engine 50 returns optimized results in the form of the following outputs:

Project level
    Forebay, tailwater, discharge, spill, turbine flow, generation, inc/dec capacities, spill percentages, turbine efficiency factor (H/K)
    Feasible limits for forebay, generation and discharge
    Forebay ramps, tailwater ramps
    Binding constraints
    Constraint violation if there is any
System level
    Total system generation, feasible generation max/min limits
    Right to power, tagged energy estimate
    Slice-to-Load VI. Main Workflow VI.A. Building the Model Since the entire multi-dam hydropower generation system behaves in a highly non-linear manner, approximations of several types must be applied in the equations to make the resulting model tractable. There are often tradeoffs between the quality of the approximations and the complexity of the resulting model. In fact, there can be a large performance difference for different ways of modeling the hydro system.

In one embodiment, for efficiency, the optimizer engine 50 is limited to the following five basic parameters: volume (Vol), inflow (Qin), discharge (Qo), spill (Qs) and turbine flow (Qp). Note that all of these parameters are characterized in the real-world metrics of water volume (kcfs). In particular, the aforementioned parameters forebay, tailwater, and generation are not included in the five basic parameters. All input data 101 constraints consisting of these parameters would have to be converted to equivalent units in the metrics of volume, discharges, and turbine flow. Even though relatively little effort is spent on constraint conversion, this conversion actually makes the resulting MIP models much simpler and easier to solve. The resulting increase in speed can reach about two orders of magnitude compared to an MIP model with the excluded, non-uniform parameters.

There are three steps towards building the MIP model: 1) express the entire hydro system logic, 2) model all the BPA environmental constraints and operator constraints, and 3) construct the utility function. In the first step, is straightforward to add the relevant constraints to the input data 101 that capture the hydro logic described above. The second and third steps are described below.

VI.B. Modeling BPA Environmental Constraints and Operator Constraints

For many point measurement environmental constraints, Gurobi constraints are created for the corresponding parameter. Examples of these Gurobi constraints include constraints on the discharge, turbine flow, and other constraints. Many of the other input data 101 constraints have to be transformed or approximated so that they are tractable.

VI.A.1. Slack Variables

Slack variables for each of the BPA environmental constraints and operator constraints are used in the optimizer system 100 where needed to ensure that the MIP model always produces a feasible schedule. Every slack variable is associated with the units of the uniform metric of the input data 101 used to create the MIP model. For example, the slack variables could be characterized in the uniform metric of a dollar penalty for violating the corresponding constraint by a certain margin, such as by one megawatt. In one embodiment, when a slack variable is positive in the Gurobi solver solution, the corresponding constraint has been violated and it would incur at least some level of penalties.

By way of example, in a minimum discharge environmental constraint of $Qo \geq 100$ kcfs at some hour, the constraint may not always be satisfied due to the existence of one or more conflicting constraints. To make the MIP model always feasible, a slack variable $S \geq 0$ is introduced, and the environmental constraint is rewritten as $Qo+S \geq 100$. A dollar penalty is then associated to S such that a penalty will be incurred whenever $S \geq 0$. The possibility of incurring this penalty drives the optimizer engine 50 to meet all the input data 101 constraints to avoid these penalties. Priorities can also be established for all the input data 101 constraints simply by setting up different penalties for them. That is, the input data 101 constraint with the smallest penalties is always the one that gets violated first by the optimizer engine.

VI.A.2. Modeling Forebay and Forebay Ramp Constraints

Since the MIP model does not have a forebay parameter, all of the forebay environmental constraints must be converted to the corresponding uniform metric. This conversion is performed by using the computer-based optimizer engine 50 to apply a volume-forebay function on the forebay environmental constraint values. Similarly all the forebay ramp environmental constraints must be converted to the corresponding volume ramp environmental constraints. This conversion is typically complicated by the non-linearity of the volume-forebay function.

The feasibility regions induced by the volume ramp environmental constraints are convex in form (see proof included in Appendix B). Referring to FIG. 16, both the feasibility region of the volume ramp up environmental constraint (denoted by the region from the upper curve 110 and below) and the feasibility region of volume ramp down environmental constraint (denoted by the region from the lower curve 111 and above). Thus, a combination of linear environmental constraints can be used to approximate the volume ramp up and down environmental constraints.

VI.A.3. Modeling Tailwater Environmental Constraints

Figure 17:
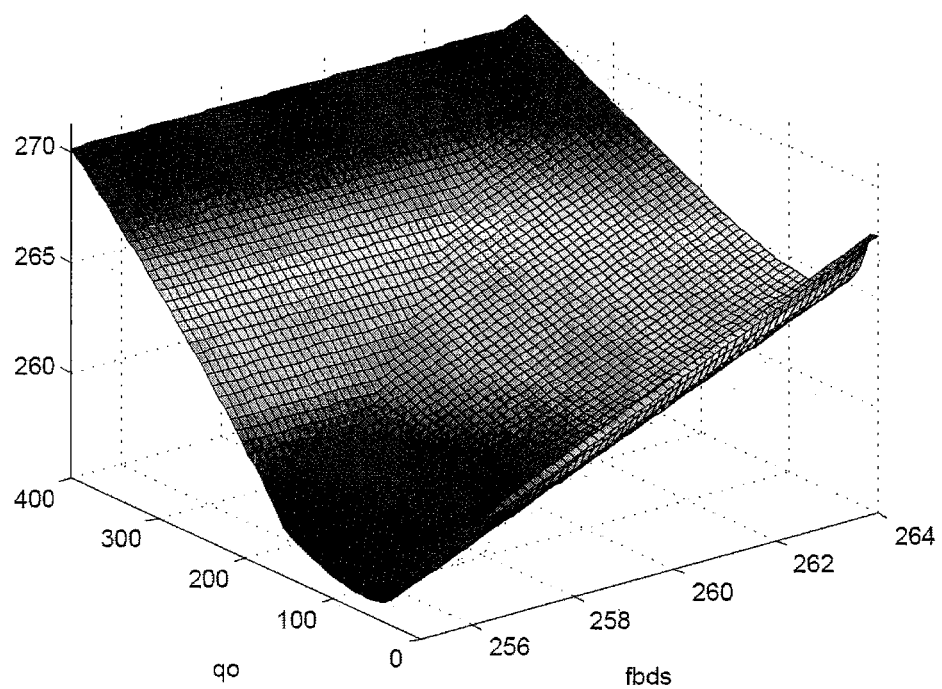
FIG. 17 shows a three-dimensional representation of the tailwater function for McNary project.

Tailwater environmental constraints can be difficult constraints to model because the simulated tailwater value for a project is a highly non-linear function of the forebay of the downstream project ($Fb_{ds}$) and the discharge (Qo). FIG. 17 shows three dimensional graph of the tailwater function for the MCN project.

Figure 18:
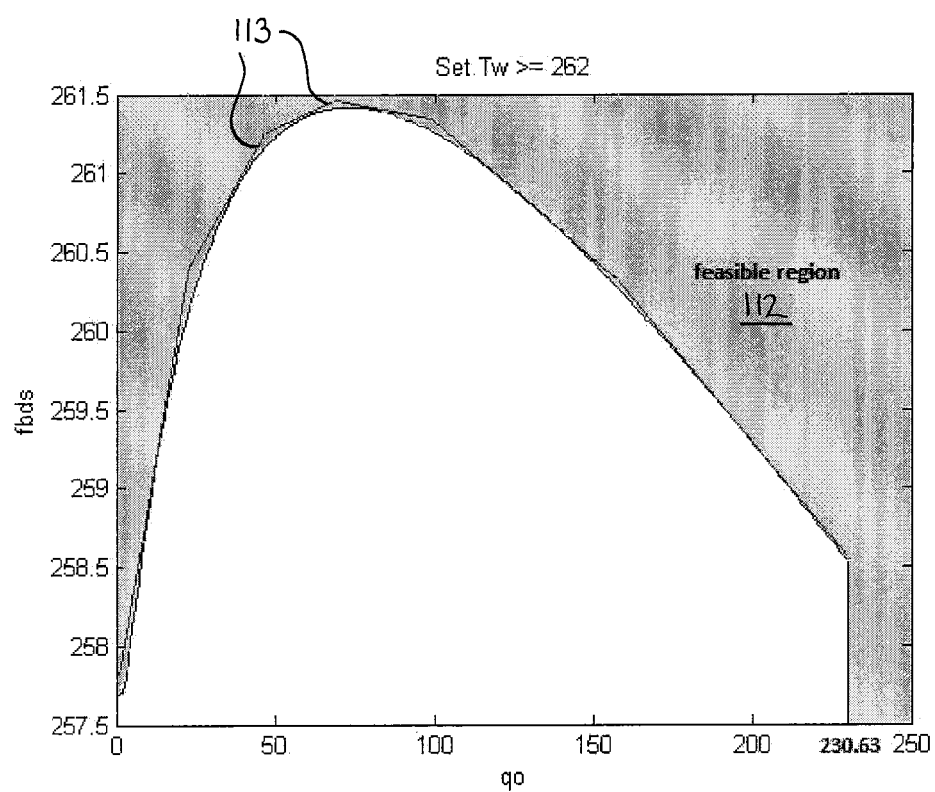
FIG. 18 is a graphical representation of one example of a minimum tailwater constraint feasible region.

To model the tailwater environmental constraint at a particular hour, for example, $tw \geq 262$, a plane $tw=262$ is used to horizontally dissect the three-dimensional tailwater curved surface shown in FIG. 17 to obtain the plot shown in FIG. 18. Note that the area above the curve is the feasibility region 112, which is clearly non-linear and concave. To express the tailwater environmental constraint, a set of straight line segments 113 is used to approximate the curve. Each line segment 113 corresponds to a linear environmental constraint on the discharge and downstream forebay. Note that the entire feasibility region 112 is approximately the intersection of all the half spaces induced by these linear constraint line segments 113. A binary variable $v_i$ is then introduced for each individual line segment 113 linear constraint $c_i$ such that $v_i=1$ if the linear constraint $c_i$ is in effect, and the $\Sigma_i c_i = 1$ relationship is enforced.

VI.A.4. Modeling Tailwater Ramp Constraints

Figure 19:
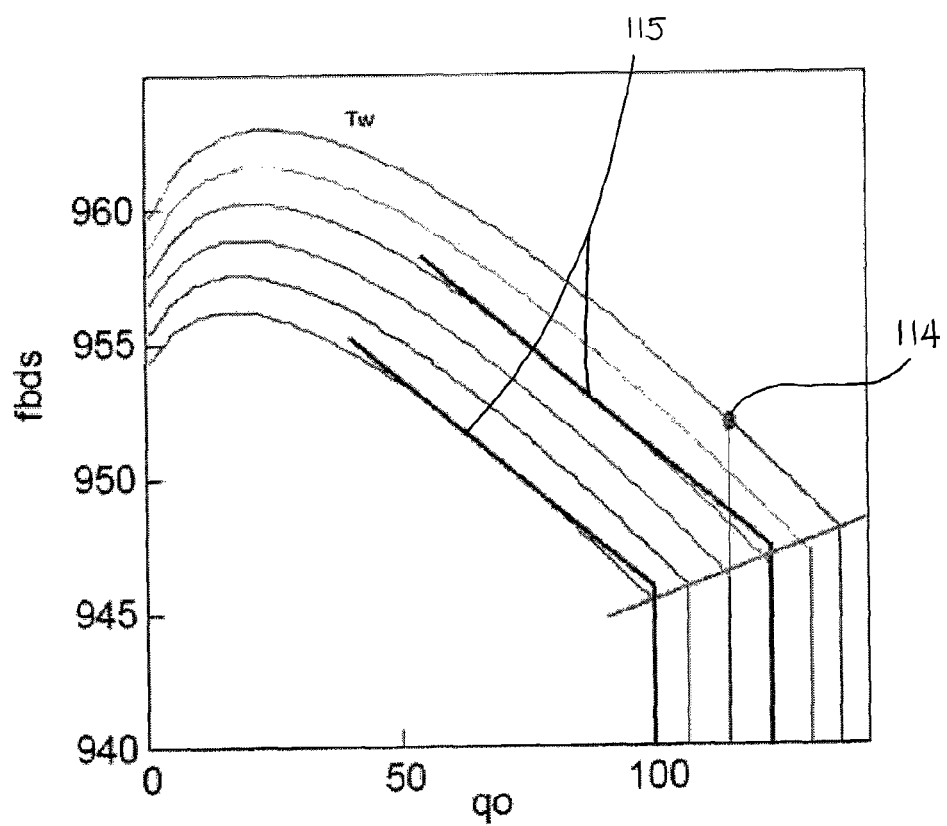
FIG. 19 is a graphical representation of one example of a tailwater ramp constraint model.
Figure 20:
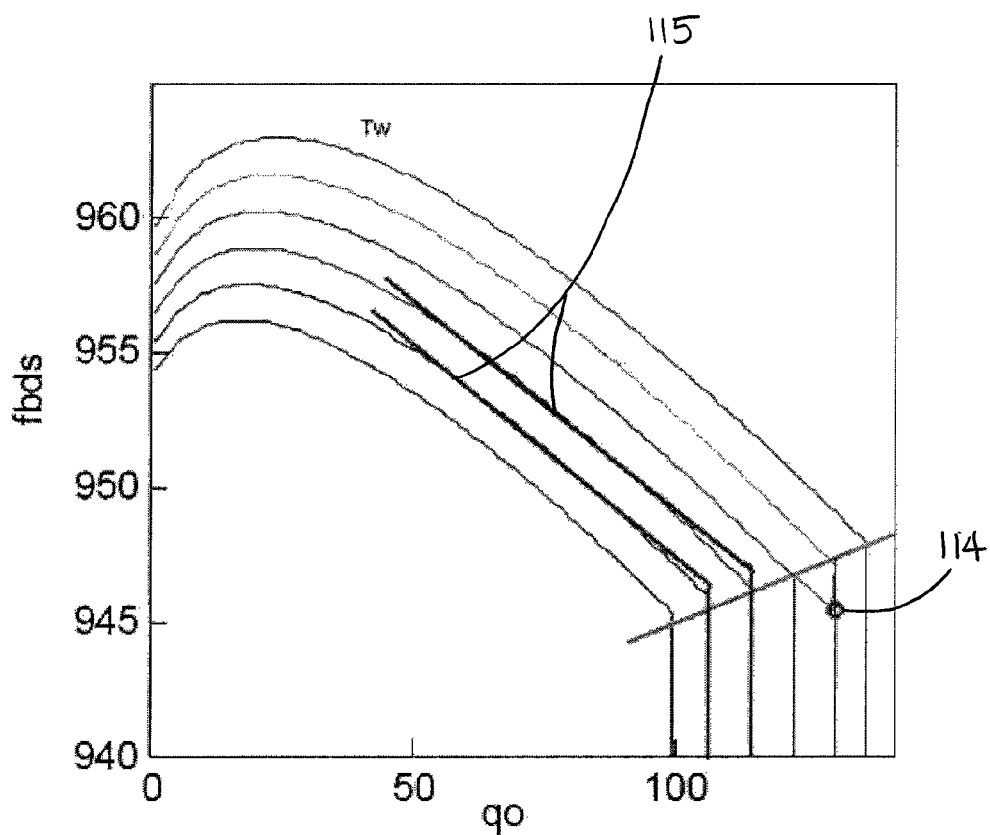
FIG. 20 is a graphical representation of one example of a tailwater ramp constraint model.

The tailwater ramp environmental constraints set an upper bound of the changes in tailwater between adjacent hours, and these environmental constraints are more difficult to model than the tailwater environmental constraints. For example, FIGS. 19 and 20 show the contour plots in which each curve represents a contour that corresponds to a particular value of the tailwater environmental constraint. It is assumed that the curves represent consecutive integer values. Note that each curve can be divided into two segments: the slanted curve, and the vertical straight line.

As one example of the foregoing principles, consider adding a tailwater ramp environmental constraint $tw(t+1) \geq tw(t)-2$. There are then two scenarios. FIG. 19 shows a first scenario, if in the previous hour there is $tw=970$, for example at the point 114 on the slanted curve, in the next hour a non-linear constraint will be added corresponding to the curve, which corresponds to two feet below that point. To further approximate this constraint, the constraint is replaced by the disjunction of two linear constraints 115 (the upper two diagonal line segments).

In the second scenario, shown in FIG. 20, if in the previous hour the tailwater environmental constraint is at the point 114 on the vertical line, in the next hour two constraints are added (the upper two diagonal line segments 115). In most situations, it will not be known during the modeling phase whether the tailwater is on the slanted curve or the vertical line in the previous hour. However, at that time it is not necessary to differentiate the two scenarios using binary variables, as is done in the tailwater constraint approximation. Instead, the two sets of linear constraints 115 can be included in the input to cover both scenarios.

Adding both sets of constraints 115 causes some redundancies in the constraints, most notably, there will be two pairs of slanted and vertical constraints such that one set is always more constraining than the other. The solver, such as the Gurobi solver, automatically eliminates the less constraining set during pre-solve so that it does not impair the overall performance of the Gurobi solver.

VI.A.5. Modeling Inc/Dec Constraints

The inc/dec environmental constraints are essentially extra buffers that BPA imposes on the total system generation to ensure that users 70 do not push to the upper/lower boundaries of the hydropower generation system's capacity. Despite the fact that incs/decs are enforced at the hydro system level, the inc/dec capacities are actually gathered from each individual project. For example, for a particular project at a given hour, GnFeasMax denotes the maximum feasible hydropower generation, or the maximum amount of hydropower generation that can be obtained without violation of any input data 101 constraints. Similarly, QoFeasMax and QpFeasMax can be defined. The following equations are true:

$$SysInc = \Sigma_P ProjInc(P)$$

$$SysDec = \Sigma_P ProjDec(P)$$

For every project at some hour, the following relations are true:

$$GnFeasMax = ProjInc + Gn$$

$$GnFeasMin = Gn - ProjDec$$

$$QoFeasMax \geq minSpill + qby + QpFeasMax$$

$$QpFeasMin + Qby + maxSpill \geq QoFeasMin$$

$$QpFeasMax \leq maxQp$$

$$QpFeasMin \geq minQp$$

$$QoFeasMax \geq Qo \geq QoFeasMin$$

$$QpFeasMax + Qby \leq (1 - minSpillPct)*QoFeasMax$$

$$QpFeasMin + Qby \geq (1 - maxSpillPct)*QoFeasMin$$

Here, ProcInc/ProcDec are the actual inc/dec capacities for the given project. The symbols maxSpill and minSpill designate the maximum and minimum spill environmental constraints, respectively. The symbols maxQp and minQp designate the maximum and minimum turbine flow environmental constraints, respectively. The symbols maxSpillPct and minSpillPct designate the maximum and minimum spill percentage environmental constraints, respectively.

VI.A.6. Modeling H/K

The simulated H/K environmental constraint characterizes the overall turbine efficiency of a hydro project. Therefore, $Gen_{Sim} = H/K_{Sim}*Qp_{Sim}$, in which $Gen_{Sim}$, $H/K_{Sim}$ and $Qp_{Sim}$ are the simulated generation, H/K and turbine flow respectively. In the MIP model, H/K is calculated based on the following formula:

$$H/K_{Sim} = (H/K_{Avg} * Head_{Sim})/Head_{Avg}$$

Here, $H/K_{Avg}$ is the average real world H/K in the last high load period or low load period during the past 24 hours. To obtain an accurate simulation of the real-world effect, $H/K_{Sim}$ has to be linearly adjusted based on $Head_{Sim}$ and $Head_{Avg}$, which are the simulated head of the current hour and the average head in the same period in which $H/K_{Avg}$ is calculated. Note that $Head_{Sim} = Fb_{Sim} - Tw_{Sim}$ and forebay and tailwater are both non-linear functions of the reservoir volumes and discharges. After multiplying head with turbine flow, the result is even more complex non-linear functions.

To mitigate this complexity and non-linearity, $H/K_{Avg}$ is used instead of $H/K_{Sim}$. Yet due to the inaccurate H/K values, there is a greater danger of violating the max or min generation targets. To avoid this and other environmental constraint violations, some pre-specified H/K generation buffers (usually in the range of about 5% to about 6%) can be built around these environmental constraints. However this may not always work, especially when there is not much flexibility in MIP model optimization.

For a better solution to the problem, a more precise approximation of $H/K_{Sim}$ is needed. Assume, for example, an environmental constraint maxGen=5000 MW on GCL, and $H/K_{Avg}$=24, $Head_{Avg}$=300 ft. This is equivalent to adding an environmental constraint on the turbine flow: $Qp \leq 5000/H/K_{Sim} = 5000*300/(24*Head_{Sim})$. Note that $Head_{Sim} = Fb_{Sim} - Tw_{Sim} = Fb(Vol) - Tw(Vol_{Ds}, Qo) = H(Vol, Vol_{Ds}, Qo)$, which is a complex nonlinear function of Volume (Vol), Volume of the downstream project ($Vol_{Ds}$) and discharge (Qo). A better approximation can be obtained through a Taylor expansion of function $1/Head_{Sim}$. Note that only the first order terms are kept to make sure the resulting environmental constraints are linear.

$$1/Head_{Sim} \approx H(Vol^*, Vol_{Ds}^*, Qo^*)^{-1} - H(Vol^*, Vol_{Ds}^*, Qo)^{-2} * (dH/dVol*(Vol-Vol^*) + dH/dVol_{Ds}*(Vol_{Ds}-Vol_{Ds}^*) + dH/dQo*(Qo-Qo^*))$$

Here $Vol^*$, $Vol_{Ds}^*$, and $Qo^*$ are some appropriate constant values of volume, volume of the downstream project, and discharge, respectively. Applying the above approximation can reduce the H/K generation buffers from the range of about 5% to about 6% down to about 0.1%.

VI.B. Stitching

Typically it takes about one to three minutes to run a 10-day optimization. This time span is too long for use on the trading desk. By contrast, short-term trading positions are usually the primary focus of the traders, and these short term positions look out 24-hours or less. Given this time restriction on the calculations, the optimizer engine 50 must be able to respond quickly to the market and trading position changes, while at the same time also maintain a 10-day fully feasible water routing schedule. Therefore, the optimizer engine 50 uses the technique of "stitching." When the user 70 must adjust a previous 10-day optimization, stitching allows the users 70 to quickly re-optimize the schedule for only the stitching period, typically 1-3 days, while keeping the results of the rest of the days intact. The stitching period is a sub-time interval of the optimization time interval, which is typically 10-days. The optimizer engine 50 is able to receive and implement the required changes without rebuilding the model during the stitching period. Stitching optimizations 81 usually take about six to ten seconds, thus providing significant time savings over the one to three minute time windows for running a complete 10-day optimization.

A stitching optimization 81 is implemented by using the "warm start" feature of the Gurobi computer based solver. After a first optimization for an optimization time interval, if only slight changes are made to the MIP model before immediately rerunning it again, the Gurobi solver is able to quickly find a solution for a second optimization for the optimization time interval by starting from the optimized results of the first optimization. Therefore, one possible set of stitching algorithms is as follows:

1. Upon receiving the MIP model and the optimized results of a first optimization, fix the values of all variables in the MIP model that fall inside the optimization time interval but outside of the stitching period;
2. Update values for the variables in the MIP model that are subject to change within the second optimization during the stitching period, such as hourly or daily generation targets and penalties, purchases, sales, transaction costs, or other variables; and
3. Re-run the revised MIP model in the Gurobi solver, which re-optimizes only for the stitching period.

In step 2 of this algorithm, all the user 70 input terms that are subject to change are modeled as variables. This ensures that when there are changes in these input data, the optimizer engine 50 can simply pick them up by updating the variable values instead of building the entire model from scratch.

More importantly, this enables the Gurobi solver to warm start and to solve the second optimization for the MIP model more quickly.

More generally, the method of stitching optimization 81 can be described as follows: After the optimizer system 100 computes a set of optimized results derived from optimizing the mixed integer linear programming model in relation to a utility function, the stitching optimization 81 begins by designating the set of optimized results as a first optimization of power generation during a first time interval. The optimizer system 100 then deploys a stitching optimization 81 by defining a stitching period as a sub-time interval of the optimization time interval. The optimizer system 100 then identifies as stitching variables one or more variables that fall within the stitching period and identifies as fixed variables each variable that falls outside the stitching period but inside the optimization time interval. The optimizer system 100 then introduces adjustments to the stitching variables while holding the fixed variables constant and compiles a revised mixed integer linear programming model based on the adjustments to the stitching variables. Finally, the optimizer system 100 computes a second optimization based on the revised mixed integer linear programming model in relation to the utility function, wherein the second optimization is optimized only for the stitching period.

VI.C. Utility Function Targets

In view of the environmental constraints discussed above, the user 70 must specify the utility function optimization generation targets to which Gurobi will optimize. The utility function is the sum of several terms, including penalties incurred by input data 101 constraint violations, penalties incurred by deviating from user 70 targets, transaction costs, and total electricity sale revenue. The input data 101 constraint penalties are discussed above. The utility function generation targets are as described below.

VI.C.1. Daily/Hourly Generation Targets

The daily and hourly generation targets are similar, so it is beneficial to focus on the hourly targets since they have a shorter lead time. In this step, a variable Deviation-From-Gen-Target is introduced to represent the deviation from generation targets at a particular hour. If SysGn is the total hydropower generation system level generation, then:

Deviation-From-Gen-Target=abs($SysGn$−hourly gen target)

Penalties can then be assigned to Deviation-From-Gen-Target to make sure any deviation from hourly generation targets is penalized correctly.

VI.C.2. Slice-to-Load Targets

The Slice-to-Load generation target specifies the minimum amount of energy obtained from the six dispatchable projects that are used to meet the load of an individual Slice customers over some period of time. For a particular hour the following logic applies:

UnMet Load=Max(0,LoadForecast−NonSliceGenTo-Load)

Slice-to-Load≤Max(RTP,UnMet Load), where LoadForecast and NonSliceGenToLoad are, respectively, the forecasted load and the generation amount from non-slice sources of the Slice customer. For each day the variable Daily-Slice-to-Load-Deficiency is introduced to represent the shortage of total daily slice-to-load.

Daily-Slice-to-Load-Deficiency=Max(0,Slice-to-Load Target−$\Sigma_t$(Slice-to-Load($t$)))

Certain penalties would then be associated to a Daily-Slice-to-Load-Deficiency. While similar to the generation targets, Slice-to-Load generation targets will only incur penalties if they fall short of the generation target.

VI.C.3. Transaction Cost Targets

The optimizer engine 50 also supports optimizing to the individual Slice customer's net position, which is determined by the load forecasts, external generation, non-load obligation, purchases, sales and BOS energy from BPA. If a Slice customer 10 deviates from the net position, the Slice customer 10 would have to either buy from or sell to the market, which would incur some transaction costs. To capture the deviation from a Slice customer's net position, the variable Deviation-From-Net-Position is introduced into the utility function, as follows:

Deviation-From-Net-Position=abs($SysGn$+BOS+externalGen+purchase−load−sales−nonLoadObligation)

An appropriate transaction cost can then be assigned to the variable Deviation-From-Net-Position to penalize the deviation from the Slice customer's net position.

VI.C.4. Inc/Dec Price Targets

During hydro planning it is often desirable to reserve as much inc/dec capabilities as possible beyond BPA's inc/dec requirements. To achieve this goal, appropriate "prices" can be assigned to the system inc/dec variables. The optimizer engine 50 then decides whether to generate or preserve the generation capabilities based on the hypothetical inc/dec prices and the forecasted electricity prices.

VI.C.5. Total Electricity Sales Revenue Targets

The last goal of the optimizer engine 50 is to optimize to the market electricity price. To this end, the input data 101 includes the market and physical inputs representing the forecasted power and capacity prices, load forecast, and non-load obligations for the user. Thus, the total electricity sales is also added to the utility function to steer the optimizer engine 50 towards generating more power when the prices are higher.

In sum, one embodiment of the method for optimization and management of a serial hydro generation system disclosed herein comprises the steps of:

providing to a computer-based optimizer engine a set of input data for optimizing power generation from a multi-dam hydropower generation system, the input data comprising:

(a) environmental constraints provided by an authority charged with managing the multi-dam hydropower generation system;

(b) time dependent generation targets for specifying the amount of power generation requested on a time dependent basis by a consumer of power generated by the hydropower generation system; and (c) market and physical data representing the forecasted power and capacity prices, load forecast, and non-load obligations for the user;

converting the input data, using the computer-based optimizer engine, from real-world metrics into a uniform metric such that each subset of input data is characterized in consistent units;

compiling, using the computer-based optimizer engine, a mixed integer linear programming model based on the input data;

computing, using a computer-based solver in operable communication with the optimizer engine, a set of optimized results derived from optimizing the mixed integer linear programming model in relation to a utility function;

reconverting the optimized results, using the computer-based optimizer engine, from the uniform metric into the real-world metrics;

producing a power generation schedule based on the optimized results; and promoting the power generation schedule to the authority for scheduling power generation by the hydropower generation system.

The embodiments disclosed above are merely representative of the system and method and not meant for the purposes of limitation. One having ordinary skill in the art would appreciate that the individual features of several disclosed embodiments are interchangeable with the features of other embodiments. For example, the system could comprise additional constraints, targets, or functionality, as desired. Consequently, it is understood that equivalents and substitutions for certain elements and components set forth above are part of the invention, and the true scope of the invention is set forth in the claims below.

APPENDIX A

Glossary of Terms

BPA—is an energy authority charged with managing the multi-dam series of hydroelectric projects. For example, the Bonneville Power Administration is the Federal Agency energy authority primarily on the Columbia and Snake rivers in the Northwest.

Constraint—A requirement that the holder of the Slice contract schedule the multi-dam hydro generation system to meet a specific limitation placed upon how that system is permitted to be run. The constraints are usually stated in a form that requires a particular variable to be less than or greater than the constraint value.

Discharge—The amount of water, in kcfsh, that flows past a dam in a particular hour.

Forebay—The forebay at a dam is the height above sea level of the water behind a dam.

Formulaic Constraint—A constraint that is not a fixed number, but is rather determined by a formula that is a function of the values of the system variables.

H/K—H/K refers to the amount of energy in megawatts that can be generated by a specific dam (or generator) as a function of a certain amount of water flowing through the turbine(s) (in kcfs).

Incremental (Decremental) Capacity ("inc/dec")—The capability of the multi-dam hydro generation system to generate more (or less) than is currently scheduled.

Kcfs—Kilo-cubic-feet-per-second. A unit of measure of water flow.

Kcfsh—Kcfs's in an hour. A measure of a quantity of water.

Linear Equation—A type of mathematical equation where variables only appear multiplied by and/or added to constant values.

Nonlinear Equation—A type of mathematical equation where variables appear in functions other than multiplied by a constant value.

Operator—The owner or administrator of the optimizer system.

Participants or Slice Participants—A participant in the Slice contract, also known as a Slice customer.

Planner—A planner is an entity tasked with managing the hydrologic elements of the watershed system. In the embodiments disclosed above, a key component of this role is to decide how to manage the hydro storage at the Grand Coulee dam. The planning for that storage is a function of various regulatory constraints that determine where the storage must be at certain times due to considerations such as flood control and salmon spawning. It also depends heavily on inflows, both expected amounts and uncertainties in those amounts.

Promote—The act of submitting generation or hydro schedules to BPA with the purpose of having those schedules be validated by the simulator so that they become the promoted or default schedules that will determine how the Slice customer's Slice system is run.

PUD (Public Utility District)—A publicly owned, not-for-profit utility whose purpose is to provide electricity to customers within its service area.

Ramp—The amount a hydro or generation variable changes over a certain time-period. For example, a one hour discharge ramp is the change in the discharge from one hour to the next.

Schedule (noun)—A time-series of electricity data that represent some aspect of the wholesale power system. Examples are a generation or load schedule, a transmission schedule, or a hydro schedule.

Schedule (verb)—The process of sending schedules to various entities to inform them of a utility's intentions in terms of how they plan to run a specific dam or generator, or what their load forecast is as another example.

Simulator—A computer program that applies constraints to a set of hydro inputs and tries to adjust the inputs in a particular order to comply with the constraints.

Slice—One of two types of contracts offered to BPA customers to meet supply power from the BPA system. The Slice contract provides the customers a "Slice" of the system, in terms of a percentage of the output of the BPA system.

Slice Contract—A contract made available to preference customers of the BPA which gives them a percentage of the Federal Power System which consists primarily hydro generation on the Columbia River. The customers are obliged to follow the rules as set forth by BPA in how the manage the system.

Slice customer—A municipality, county, or public utility district that enters into a Slice contract with the authority charged with managing the multi-dam hydropower generation system.

Spill—The amount of water that passes a dam that does not go through the turbines.

Tag/Etag—An electric industry standard protocal to inform every entity who will be affected by the flow of power on the transmission system of what energy flows are scheduled. Tags are sent electronically to entities listed on the tag with certain types of entities having the opportunity to approve or deny the tag based upon their business and reliability rules.

Tailwater—The tailwater at a dam is the height above sea level of the water immediately downstream of the dam.

Trader—An employee of a utility or other electricity company who manages load obligations and a portfolio of assets, such as generation sources and or contracts, and transacts in power markets to achieve various objectives. Traders are typically referred to in connection with the markets in which they specialize. For example, forward traders trade power typically for the balance of the month and beyond, cash or day-ahead traders trade power for the next day or several days, and real-time traders trade power for the next hour or within the day.

Turbine Flow—The amount of water that flows through the turbines at a dam.

Utility—A company whose purpose is to provide electricity to its customers.

Utility Function—The baseline, standard, or characteristic to which the optimizer system 100 seeks optimization. Roughly speaking, the utility function would represent something like profit or revenue, in which case the goal is to optimize the profit or revenue. In actuality, there are other components to the optimizer's utility function such as if one violates a constraint then the utility function incurs a cost which is equal to the amount of the violation times the dollar penalty per violation per MWh. These costs are not actual costs in the sense that it may be a constraint that a planner has added to the system to keep it from approaching a BPA constraint—thus, a violation does not correspond to an actual dollar cost. The optimizer treats the revenue as being the amount of generation times the price one gets for the generation regardless if one actually sells the generation or uses it to meet one's own load.

APPENDIX B

Proof for the Convexity of Feasibility Regions Induced by the Volume-Ramp Constraints Problem The volume of the reservoir V is a non-linear function of the forebay elevation f, $$v=a*(f-b)^c,$$

where a, b and c>1 are project specific constants. f and f' are denoted to be the forebay elevation on this hour and the maximum forebay next hour, v and v' be the corresponding reservoir volumes. The forebay ramp-down constraints state that $$f'=f+d,$$

where d>0 is a constant. Converting it into the volume ramp-down constraints yields $$v'=a*(f'-b)^c=a*(f+d-b)^c=a*((v/a)^{(1/c)}+d)^c,$$

which is clearly a non-linear function of v.

Next it will be shown that the v' is concave so that the feasibility region below is convex. For simplicity of the proof, constant a is dropped from the function since it does not affect the convexity.

Proposition

The function $$H(v)=(v^{(1/c)}+d)^c$$

is concave.

Proof

To prove Function H(v) is concave it suffices to show that the second order derivative is negative.

$$dH/dv=c(v^{(1/c)}+d)^{(c-1)}*(1/c)*v^{(1/c-1)}=(v^{(1/c)}+d)^{(c-1)}*v^{(1/c-1)},$$

and $$dH^2/dv=(c-1)*(v^{(1/c)}+d)^{(c-2)}*(1/c)*v^{(1/c-1)}*v^{(1/c-1)}+(v^{(1/c)}+d)^{(c-1)}*(1/c-1)*v^{(1/c-2)}$$

simplifying;

$$dH^2/dv=(c-1)*(v^{(1/c)}+d)^{(c-2)}*v^{(1/c-2)}*((1/c)*v^{(1/c-1)}*v+(-1/c)*v^{(1/c)}+d))$$

finally;

$$dH^2/dv=-(c-1)*(v^{(1/c)}+d)^{(c-2)}*v^{(1/c-2)}*d/c$$

therefore $$dH^2/dv<0,$$

since c>1 and d>0. Q.E.D.

Similarly it can be shown that function $$G(v)=(v^{(1/c)}-d)^c$$

is convex, which implies that the feasibility region induced by the discharge ramp-up constraint is also convex.

What is claimed is:

1. A method for optimization and management of a serial dam hydro generation system, said method comprising the steps of:
   determining a respective water forebay, tailwater and volume of project water reservoir corresponding with each of multiple discrete dams comprising the serial dam hydro generation system, each dam associated with at least one hydroelectric generator in a series of hydroelectric generators comprising a multi-dam hydropower generation system and each volume is based upon a shape of a respective portion of river basin associated with each dam;
   providing to a computer-based optimizer engine a set of input data related to optimizing power generation of a multi-dam hydropower generation system, the set of input data comprising:
   (a) the determined respective water forebay, volume and tailwater at the multiple dams comprising the multi-dam hydropower generation system combined with volume, inflow, discharge, spill and turbine flow for each respective dam comprising the hydropower generation system;
   (b) time dependent generation targets for specifying an amount of power generation requested on a time dependent basis by a consumer of power generated by the hydropower generation system; and
   (c) market and physical data representing forecasted power and capacity prices, load forecast, and non-load obligations for the user;
   converting the set of input data (a) through (c), using the computer-based optimizer engine, from real-world metrics into a uniform metric such that the uniform metric is characterized in consistent units;
   compiling, using the computer-based optimizer engine, a mixed integer linear programming model based on the uniform metric;
   modeling Bonneville Power Administration (BPA) environmental constraints within the computer-based optimizer engine, including constraints on discharge, turbine flow, slack variables and associated penalties;
   modeling operator constraints within the computer-based optimizer engine including a dollar penalty for violating a given constraint;
   modeling a daily generation target;
   producing a power generation schedule including an amount of energy in megawatts that may be generated by each specific dam for the series of hydroelectric generators comprising serial dam hydro generation system, based upon the input data (a) through (d) and the mixed integer linear programming model;
   generating feasibility regions based upon volume ramp environmental constraints;
   allocating the daily generation target based upon a change in inflows and one or both of the BPA constraints and modeled operator constraints; and
   controlling hydro parameters at each dam including an amount of water that flows through turbines associated with each respective dam included in the serial dam hydro generation system, based upon the power generation schedule and feasibility regions.

2. The method of claim 1, wherein the step of computing a set of optimized results derived from optimizing the mixed integer linear programming model in relation to a utility function further comprises the steps of:

designating the set of optimized results as a first optimization of power generation during an optimization time interval; and deploying a stitching optimization, wherein the stitching optimization comprises the steps of:

defining a stitching period as a sub-time interval of the optimization time interval; identifying as stitching variables one or more variables that fall within the stitching period;

identifying as fixed variables each variable falling inside the optimization time interval and outside the stitching period;

introducing adjustments to the stitching variables while holding the fixed variables constant;

compiling a revised mixed integer linear programming model based on the adjustments to the stitching variables; and computing a second optimization based on the revised mixed integer linear programming model in relation to the utility function, wherein the second optimization is optimized only for the stitching period.

3. The method of claim 1, wherein the step of computing a set of optimized results derived from optimizing the mixed integer linear programming model in relation to a utility function further comprises the step of defining the utility function in terms of optimization targets and penalties incurred by input data constraint violations.

4. The method of claim 1, wherein the step of providing to the computer-based optimizer engine a set of input data for optimizing power generation from the multi-dam hydropower generation system further comprises the step of associating a slack variable with one or more environmental constraints.

5. The method of claim 1, wherein the step of providing to the computer-based optimizer engine a set of input data for optimizing power generation from the multi-dam hydropower generation system further comprises the step of defining the environmental constraints received from the authority to include point measurement constraints, ramp constraints, average discharge constraints, forebay band and forebay touch constraints, generation reserve constraints, and formulaic constraints.

6. The method of claim 2, wherein the step of computing a set of optimized results derived from optimizing the mixed integer linear programming model in relation to a utility function further comprises the step of defining the utility function in terms of optimization targets and penalties incurred by input data constraint violations.

7. The method of claim 2, wherein the step of providing to the computer-based optimizer engine a set of input data for optimizing power generation from the multi-dam hydropower generation system further comprises the step of associating a slack variable with one or more environmental constraints.

8. The method of claim 6, wherein the step of providing to the computer-based optimizer engine a set of input data for optimizing power generation from the multi-dam hydropower generation system further comprises the step of associating a slack variable with one or more environmental constraints.

9. The method of claim 2, wherein the step of providing to the computer-based optimizer engine a set of input data for optimizing power generation from the multi-dam hydropower generation system further comprises the step of defining the environmental constraints received from the authority to include point measurement constraints, ramp constraints, average discharge constraints, forebay band and forebay touch constraints, generation reserve constraints, and formulaic constraints.

10. The method of claim 8, wherein the step of providing to the computer-based optimizer engine a set of input data for optimizing power generation from the multi-dam hydropower generation system further comprises the step of defining the environmental constraints received from the authority to include point measurement constraints, ramp constraints, average discharge constraints, forebay band and forebay touch constraints, generation reserve constraints, and formulaic constraints.

11. A system for optimization and management of a serial hydropower generation system, the system comprising:

at least one server in logical communication with a hydropower generation system comprising multiple dams providing water flow to multiple hydroelectric generators and comprising at least one processor operatively associated with at least one memory, wherein the memory comprises instructions that when executed by the at least one processor causes the at least one processor to:

provide to a computer-based optimizer engine a set of input data associated with the multiple dams providing water flow to multiple hydroelectric generators comprising the hydropower generation system, the input data comprising:

a. a determined water forebay, tailwater and volume of project water reservoir corresponding with each of multiple discrete dams comprising a serial dam hydro generation system;

b. Bonneville Power Administration (BPA) environmental constraints provided on an hourly basis;

c. time dependent generation targets for specifying an amount of power generation requested on an hourly basis by a user; and d. load forecast, and non-load obligations for the user;

convert the input data, using the computer-based optimizer engine, from real-world metrics into a uniform metric comprising multiple subsets of input data characterized in consistent units;

compile, using the computer-based optimizer engine, a mixed integer linear programming model based on the uniform metric;

model the Bonneville Power Administration (BPA) environmental constraints within the computer-based optimizer engine, including constraints on discharge, turbine flow, slack variables and associated penalties for each dam in a multiple serial dam hydroelectric system;

model operator constraints within the computer-based optimizer engine including a dollar penalty for violating a given constraint;

model a daily generation target;

generate feasibility regions based upon volume ramp environmental constraints;

allocate the daily generation target based upon a charge in inflows and one or both of the BPA constraints and modeled operator constraints produce a power generation schedule for controlling hydro parameters including the water flow into each respective serial dam hydroelectric generators based upon the input data (a) through (d), the mixed integer linear programming model, the BPA environmental constraints, the operator constraints, the daily generation target and feasibility regions; and based upon an input from the user, submit a hydro schedule to control respective water flow to the multiple hydroelectric generators in the serial dam hydro generation system during a specified time period.

12. The system of claim 11, wherein the memory further comprises instructions that cause the server to:
   designate the set of optimized results as a first optimization of power generation during an optimization time interval; and
   deploy a stitching optimization, wherein the stitching optimization:
   define a stitching period as a sub-time interval of the optimization time interval;
   identify as stitching variables one or more variables that fall within the stitching period;
   identify as fixed variables each variable falling inside the optimization time;
   interval and outside the stitching period;
   introduce adjustments to the stitching variables while holding the fixed variables constant;
   compile a revised mixed integer linear programming model based on the adjustments to the stitching variables; and
   compute a second optimization based on the revised mixed integer linear programming model in relation to the utility function, wherein the second optimization is optimized only for the stitching period.

13. The system of claim 11, wherein the memory further comprises instructions that cause the server to define the utility function in terms of optimization targets and penalties incurred by input data constraint violations.

14. The system of claim 11, wherein the memory further comprises instructions that cause the server to associate a slack variable with one or more environmental constraints.

15. The system of claim 11, wherein the memory further comprises instructions that cause the server to define the environmental constraints received from the authority to include point measurement constraints, ramp constraints, average discharge constraints, forebay band and forebay touch constraints, generation reserve constraints, and formulaic constraints.

16. The system of claim 12, wherein the memory further comprises instructions that cause the server to define the utility function in terms of optimization targets and penalties incurred by input data constraint violations.

17. The system of claim 12, wherein the memory further comprises instructions that cause the server to associate a slack variable with one or more environmental constraints.

18. The system of claim 16, wherein the memory further comprises instructions that cause the server to associate a slack variable with one or more environmental constraints.

19. The system of claim 12, wherein the memory further comprises instructions that cause the server to define the environmental constraints received from the authority to include point measurement constraints, ramp constraints, average discharge constraints, forebay band and forebay touch constraints, generation reserve constraints, and formulaic constraints.

20. The system of claim 18, wherein the memory further comprises instructions that cause the server to define the environmental constraints received from the authority to include point measurement constraints, ramp constraints, average discharge constraints, forebay band and forebay touch constraints, generation reserve constraints, and formulaic constraints.

* * * * *